United States Patent
Lesso et al.

(10) Patent No.: US 7,626,445 B2
(45) Date of Patent: *Dec. 1, 2009

(54) CHARGE PUMP CIRCUIT AND METHODS OF OPERATION THEREOF

(75) Inventors: John P. Lesso, Edinburgh (GB); John L. Pennock, Midlothian (GB); Peter J. Frith, Edinburgh (GB)

(73) Assignee: Wolfson Microelectronics plc, Edinburgh (GB)

( * ) Notice: Subject to any disclaimer, the term of this patent is extended or adjusted under 35 U.S.C. 154(b) by 14 days.

This patent is subject to a terminal disclaimer.

(21) Appl. No.: 12/000,545

(22) Filed: Dec. 13, 2007

(65) Prior Publication Data

US 2008/0150619 A1    Jun. 26, 2008

(30) Foreign Application Priority Data

Dec. 22, 2006   (GB)   ................... 0625954.3

(51) Int. Cl.
*G05F 1/10*   (2006.01)
*G05F 3/02*   (2006.01)

(52) U.S. Cl. .................. 327/536; 327/535; 327/537; 363/59; 363/60

(58) Field of Classification Search .......... 327/535–537; 363/59, 60

See application file for complete search history.

(56) References Cited

U.S. PATENT DOCUMENTS

| | | | |
|---|---|---|---|
| 3,772,606 A | 11/1973 | Waehner | |
| 4,054,843 A | 10/1977 | Hamada et al. | |
| 4,115,739 A | 9/1978 | Sano et al. | |
| 4,409,559 A | 10/1983 | Amada et al. | |
| 4,430,625 A | 2/1984 | Yokoyama et al. | |
| 5,075,643 A | 12/1991 | Einbinder | |
| 5,289,137 A | 2/1994 | Nodar et al. | |
| 5,414,614 A | 5/1995 | Fette et al. | |
| 5,442,317 A | 8/1995 | Stengel | |
| 5,532,916 A | 7/1996 | Tamagawa et al. | |
| 5,623,222 A | 4/1997 | Tamagawa | |
| 5,760,637 A | 6/1998 | Wong et al. | |

(Continued)

FOREIGN PATENT DOCUMENTS

EP    0 585 925    3/1994

(Continued)

OTHER PUBLICATIONS

"Dual Power JFET-Input Operational Amplifier With Switched-Capacitor Voltage Converter", TLE2662, Texas Instruments, pp. 1, 2, 10, 25 (1994).

(Continued)

*Primary Examiner*—Lincoln Donovan
*Assistant Examiner*—Adam D Houston
(74) *Attorney, Agent, or Firm*—Dickstein Shapiro LLP

(57) ABSTRACT

A dual mode charge-pump circuit and associated method and apparatuses for providing a plurality of output voltages, using a single flying capacitor, the circuit including a network of switches that is operable in a number of different states and a controller for operating said switches in a sequence of the states so as to generate positive and negative output voltages together spanning a voltage approximately equal to the input voltage and centered on the voltage at the common terminal, in a first mode and positive and negative output voltages each up to substantially the input voltage in a second mode.

34 Claims, 14 Drawing Sheets

U.S. PATENT DOCUMENTS

| | | |
|---|---|---|
| 5,790,393 A | 8/1998 | Fotouhi |
| 5,898,340 A | 4/1999 | Chatterjee et al. |
| 6,084,789 A * | 7/2000 | Van Lieshout ............... 363/60 |
| 6,166,605 A | 12/2000 | Carver |
| 6,329,800 B1 | 12/2001 | May |
| 6,370,046 B1 * | 4/2002 | Nebrigic et al. ............... 363/60 |
| 6,373,340 B1 | 4/2002 | Shashoua et al. |
| 6,377,252 B2 * | 4/2002 | Ikeda ......................... 345/211 |
| 6,586,992 B1 | 7/2003 | Strakovsky |
| 6,643,151 B1 * | 11/2003 | Nebrigic et al. ............... 363/59 |
| 6,788,039 B2 * | 9/2004 | Abdoulin .................... 323/288 |
| 6,825,726 B2 | 11/2004 | French et al. |
| 6,828,845 B2 | 12/2004 | Pennock et al. |
| 6,859,091 B1 * | 2/2005 | Nicholson et al. ........... 327/536 |
| 6,985,024 B2 * | 1/2006 | Geen .......................... 327/536 |
| 7,030,699 B2 | 4/2006 | Richard et al. |
| 7,183,857 B2 | 2/2007 | Doy et al. |
| 7,236,046 B2 * | 6/2007 | Georgescu et al. .......... 327/536 |
| 7,541,859 B2 * | 6/2009 | Akashi et al. ............... 327/536 |
| 7,550,943 B2 * | 6/2009 | Spartano et al. ............. 320/107 |
| 2002/0153940 A1 | 10/2002 | Wurcer et al. |
| 2003/0174524 A1 * | 9/2003 | Botker et al. ................. 363/60 |
| 2004/0246050 A1 | 12/2004 | Kikuchi |
| 2005/0024962 A1 | 2/2005 | Chan et al. |
| 2005/0110574 A1 | 5/2005 | Richard et al. |
| 2005/0285682 A1 | 12/2005 | Lee et al. |
| 2006/0028849 A1 | 2/2006 | Ogata et al. |
| 2008/0044041 A1 * | 2/2008 | Tucker et al. ............... 381/120 |
| 2008/0116979 A1 | 5/2008 | Lesso et al. |
| 2008/0144861 A1 * | 6/2008 | Melanson et al. ........... 381/120 |
| 2008/0150619 A1 * | 6/2008 | Lesso et al. .................. 327/536 |
| 2008/0150620 A1 * | 6/2008 | Lesso ......................... 327/536 |
| 2008/0150621 A1 | 6/2008 | Lesso et al. |
| 2008/0159567 A1 * | 7/2008 | Lesso et al. .................. 381/120 |
| 2009/0039947 A1 * | 2/2009 | Williams .................... 327/536 |
| 2009/0154733 A1 * | 6/2009 | Lesso et al. .................. 381/120 |

FOREIGN PATENT DOCUMENTS

| | | |
|---|---|---|
| EP | 1 569 330 | 8/2005 |
| GB | 2 418 792 | 4/2006 |
| JP | 7-240636 | 9/1995 |
| JP | 8-191224 | 7/1996 |
| JP | 2001-185960 | 7/2001 |
| JP | 2002-198750 | 7/2002 |
| JP | 2005-260581 | 9/2005 |
| WO | WO 94/11799 | 5/1994 |
| WO | WO 01/78248 | 10/2001 |
| WO | WO 03/096520 | 11/2003 |
| WO | WO 2004/019485 | 3/2004 |
| WO | WO 2005/101627 | 10/2005 |
| WO | WO 2006/031304 | 3/2006 |

OTHER PUBLICATIONS

Linear Technologies LTC 1983-3/LTC 1983-5 "100mA Regulated Charge-Pump Inverters in ThinSOT" Technical Description, pp. 1-12.

Dallas Semiconductor MAXIM Application Note 656 "Design Trade Offs for Single-Supply Op Amps.".

\* cited by examiner

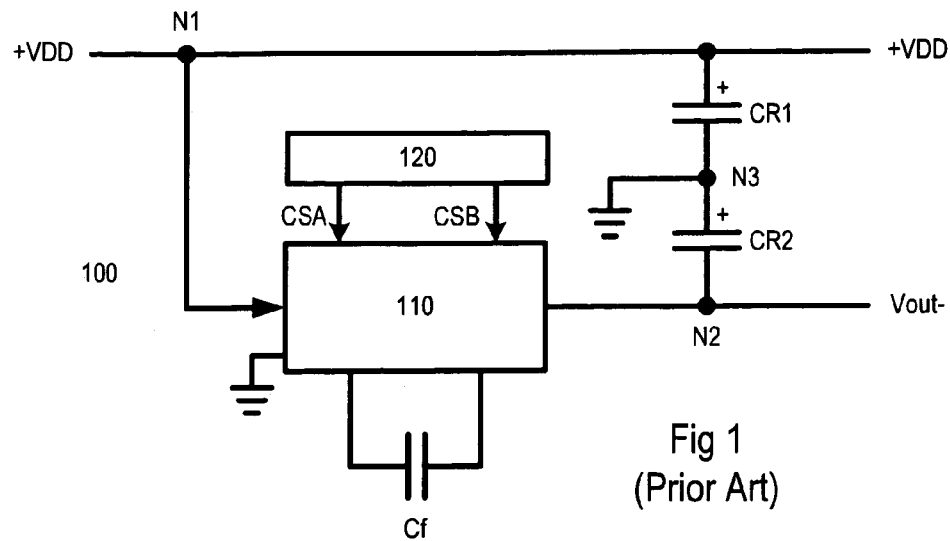
Fig 1
(Prior Art)
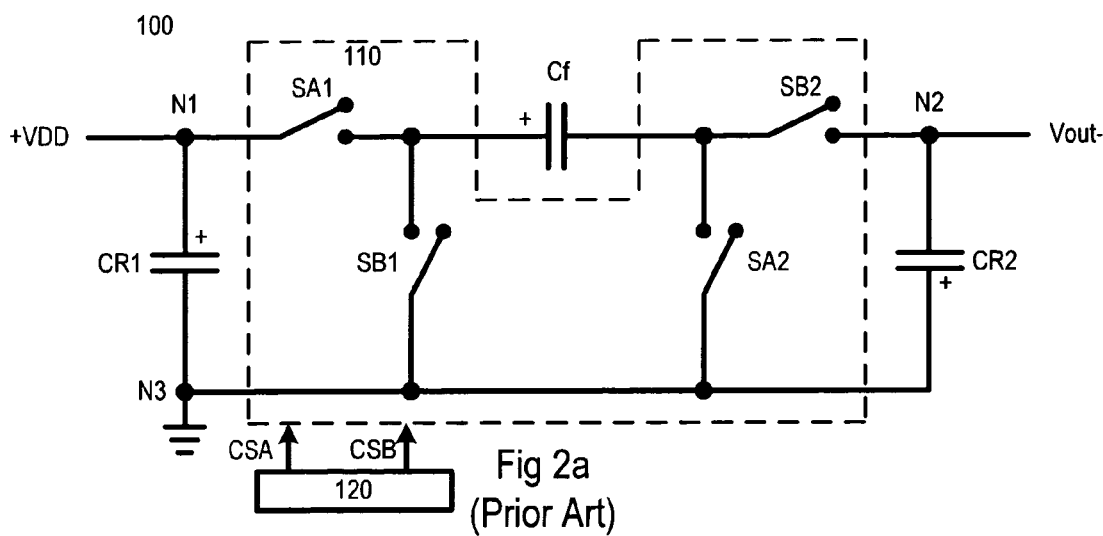
Fig 2a
(Prior Art)
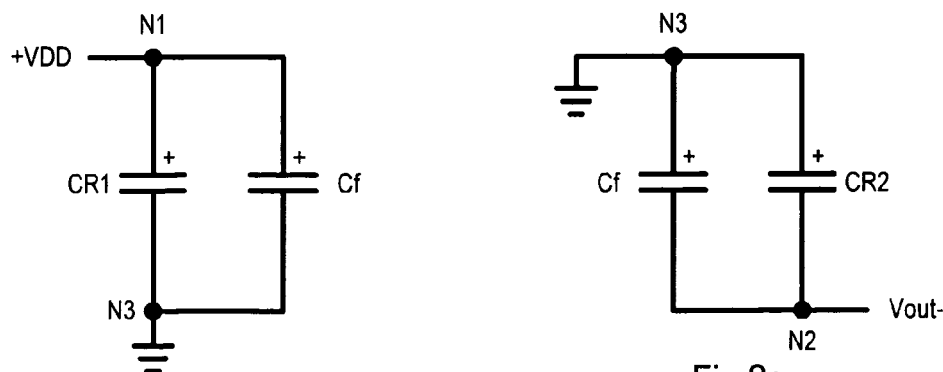
Fig 2b
(Prior Art)
Fig 2c
(Prior Art)

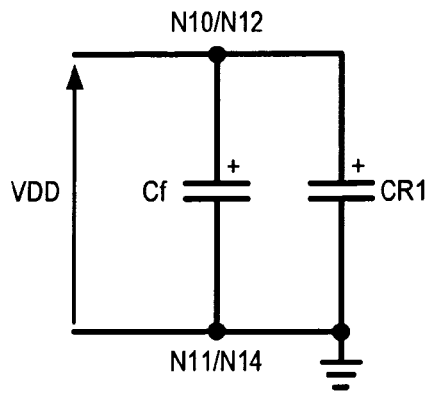
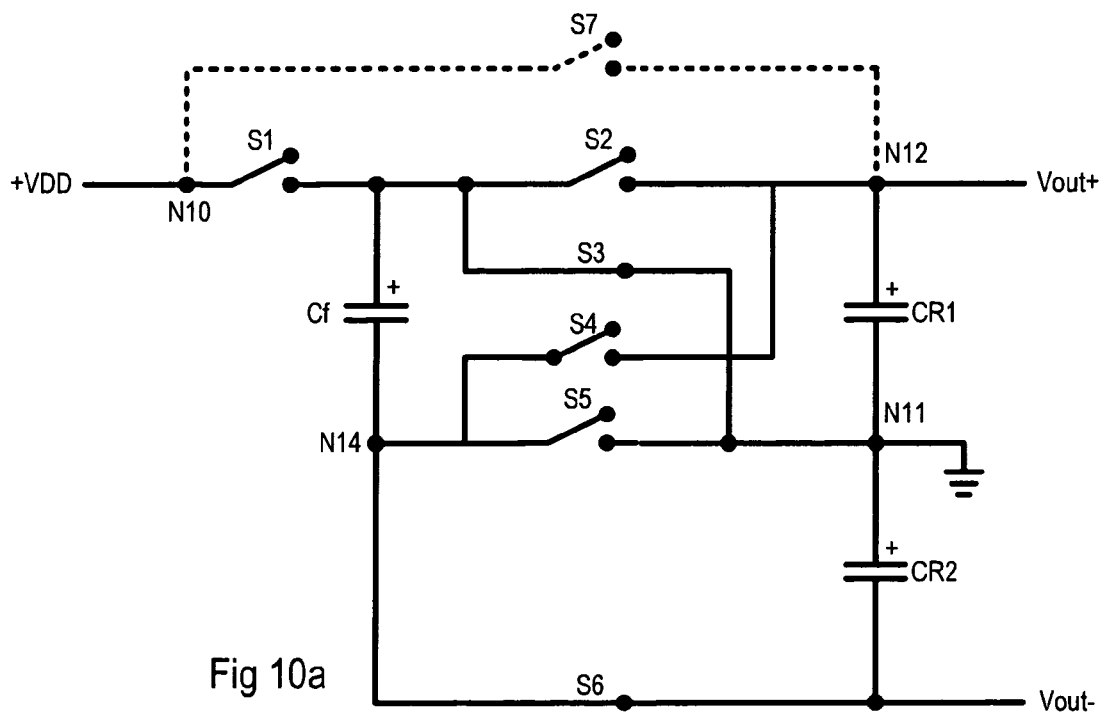
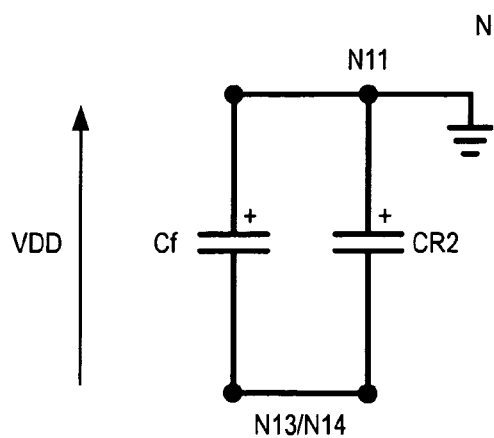
Fig 9b
Fig 10a
Fig 10b

CHARGE PUMP CIRCUIT AND METHODS OF OPERATION THEREOF

The present invention relates to charge pump circuits and in particular charge pump circuits which provide a dual rail output.

Charge pump circuits are known in the art. These circuits are a type of DC-DC converter which use capacitors as energy storage device and are able to provide a power source at a higher or lower voltage than that obtained from an input source. Charge pump circuits are capable of high efficiencies, sometimes as high as 90-95%.

Charge pumps use some form of switching device(s) to control the connection of the capacitors to voltage sources and to one another, to typically obtain voltages other than the input voltage value. The charge pump includes a capacitor, typically known as a "flying capacitor", for transferring charge to one or more output capacitors, which will be referred to as "reservoir capacitors". Such charge pumps can be used to generate dual rail, that is bipolar, supply voltages from a single rail input voltage VDD. A drawback with known dual rail charge pumps is that they may, for example, produce an output voltage having a magnitude twice the input voltage (VDD), that is, one rail is at a voltage VDD, the other at a voltage −VDD, with reference to a common terminal. This can be very inefficient if such a charge pump is used, for example, to power circuitry that amplifies a signal that has a maximum amplitude much smaller than the amplifier circuitry's power supply +/−VDD. In such a case most of the output power (and therefore input power) is wasted in producing heat as opposed to driving the signal. However, of course, it is sometimes advantageous to be able to select this full output range when desired.

It is an aim of the present invention to address the above mentioned drawback.

In a first aspect of the invention there is provided a method of generating a split-rail voltage supply from a single input supply received across an input terminal and a common terminal, the split-rail supply being output at first and second output terminals connected to the common terminal via respective first and second loads and also via respective first and second reservoir capacitors, the method comprising connecting a flying capacitor between different ones of the terminals in a sequence of states, so as to transfer packets of charge repeatedly from the input supply to the reservoir capacitors directly or via the flying capacitor and thereby to generate the split rail supply with positive and negative output voltages either together spanning a voltage approximately equal to the input voltage, and centered on the voltage at the common terminal, or positive and negative output voltages each up to substantially the input supply, depending on a chosen mode of operation.

Also disclosed is a method of generating a split-rail voltage supply from a single input supply voltage received across an input terminal and a common terminal, the split-rail supply being output at first and second output terminals connected to the common terminal via respective first and second loads and also via respective first and second reservoir capacitors, the method using a single flying capacitor to generate the split rail supply with positive and negative output voltages either together spanning a voltage approximately equal to the input voltage, and centered on the voltage at the common terminal, or positive and negative output voltages each up to substantially the input supply, depending on a chosen mode of operation.

The method may comprise, when operating in a first mode, interleaving repetitions of at least first and second states, the first state being effective to divide the input voltage between the flying capacitor and first reservoir capacitor in series, the second state being effective to apply the flying capacitor's portion of the divided voltage across the second reservoir capacitor. The first state may be obtained by connecting the flying capacitor across the input terminal and the first output terminal, and the second state may be obtained by connecting the flying capacitor across the common terminal and the second output terminal. The sequence in the first mode may include repetitions of a third state, the third state being effective to apply the flying capacitor's portion of the divided voltage across the first reservoir capacitor. The third state may be obtained by connecting the flying capacitor across the first output terminal and the common terminal.

The method may comprise, when operating in a first mode, interleaving repetitions of at least fourth and fifth states, the fourth state being effective to charge up the flying capacitor across the input voltage, the fifth state being effective to divide the voltage on the flying capacitor between the first reservoir capacitor and second reservoir capacitor in series. The fourth state may be obtained by connecting the flying capacitor across the input terminal and the common terminal and the fifth state may be obtained by connecting the flying capacitor across the first output terminal and the second output terminal.

The method may comprise, when operating in a second mode, interleaving repetitions of at least second and sixth states, the sixth state being effective to charge the flying capacitor and the first reservoir capacitor substantially to the input voltage, the second state being effective to transfer the voltage from the flying capacitor to the second reservoir capacitor. The second state may be obtained by connecting the flying capacitor across the common terminal and the second output terminal, and the sixth state may be obtained by connecting the input terminal to the first output terminal and the flying capacitor across this node and the common terminal. The sequence in the second mode may include repetitions of a seventh state, the seventh state being effective to charge the flying capacitor independent of either reservoir capacitor. The seventh state may be obtained by connecting the flying capacitor across the input terminal and the common terminal, the input terminal being isolated from the first output terminal.

When operating in a particular implementation of a second mode, a connection may be maintained between the input terminal and the first output terminal independent of the flying capacitor thus ensuring that the first reservoir capacitor is always connected between the input terminal and the common terminal when operating in this particular implementation.

A selection signal may be used to implement a second mode of operation in any of the variants disclosed herein.

Depending on the state, one of the flying capacitors may be connected independently to one of the input terminal, the first output terminal or the common terminal.

Depending on the state, the other flying capacitor terminal may be connected independently to one of the first output terminal, the common terminal or the second output terminal.

Any sequence of states may be varied according to load conditions. The variation in the sequence of states may include lowering the frequency of inclusion of the second state should the load be asymmetrical.

The first reservoir capacitor may be charged only when the voltage at the first output terminal falls below a first threshold value and the second reservoir capacitor may be charged only when the voltage at the second output terminal falls below a second threshold value.

The method may further comprise the initial step of selecting the mode of operation.

The method may further comprise using the split-rail voltage supply generated to power an amplifier circuit having a signal output for connection to a load wherein, in response to an output level demand signal, the range of signals generated at the signal output may be altered by operating in either the first mode or the second mode of operation.

When the amplifier circuit is driving a headphone, the first mode may be used, and when the amplifier circuit may be driving a line input the second mode may be used. The method may further comprise limiting the current at the signal output when operating in the second mode. The output level demand signal may be derived by reference to a volume setting input of the amplifier, the first mode being selected when the volume may be at a maximum.

In a further aspect of the invention there is provided a charge-pump circuit for providing a plurality of output voltages, the circuit comprising:
- an input terminal and a common terminal for connection to an input voltage,
- first and second output terminals for outputting the plurality of output voltages, the first and second output terminals being, in use, connected to the common terminal via respective first and second loads and also via respective first and second reservoir capacitors,
- first and second flying capacitor terminals for connection to one flying capacitor,
- a network of switches that is operable in a plurality of different states for interconnecting the terminals, and
- a controller for operating the network of switches in a sequence of the different states, wherein the controller is operable in first and second modes, and where, in the first of the modes, the sequence is adapted repeatedly to transfer packets of charge from the input terminal to the reservoir capacitors via the flying capacitor depending on the state, thereby generating positive and negative output voltages together spanning a voltage approximately equal to the input voltage, and centered on the voltage at the common terminal.

It should be noted that the term "together spanning a voltage approximately equal to the input voltage, and substantially centered on the voltage at the common terminal", should be taken, for example, to cover the situation when the circuit is lightly loaded, wherein the output voltages levels will, in reality, be +/−half the input voltages less Iload.Rload, where Iload equals the load current and Rload equals the load resistance.

In a yet further aspect of the invention there is provided a charge-pump circuit for providing a plurality of output voltages, the circuit comprising:
- an input terminal and a common terminal for connection to an input voltage,
- first and second output terminals for outputting the plurality of output voltages, the first and second output terminals being, in use, connected to the common terminal via respective first and second loads and also via respective first and second reservoir capacitors,
- a plurality of first and second flying capacitor terminals for connection to a plurality of flying capacitors,
- a network of switches that is operable in a plurality of different states for interconnecting the terminals, and
- a controller for operating the network of switches in a sequence of the different states, wherein the controller is operable in first and second modes, and where, in the first of the modes, the sequence is adapted repeatedly to transfer packets of charge from the input terminal to the reservoir capacitors via the flying capacitor depending on the state, thereby generating positive and negative output voltages each of a magnitude up to substantially a fraction of the input voltage, the fraction of the input voltage being substantially $1/(n+1)$, where n is an integer representing the number of flying capacitors.

In this aspect, the circuit may be able to generate output voltages of magnitudes at different fractions of the input voltage. which may include the inverse of some or all of each integer between 2 and (n+1).

Any audio apparatus described or claimed herein may be in portable form, or comprise part of a communications apparatus, an in-car audio apparatus or a (possibly stereo) headphone apparatus.

In another aspect of the invention there is provided a charge pump circuit for providing a plurality of supply voltages from an input voltage, the charge pump circuit having first and second output terminals and a common terminal for connection to first and second reservoir capacitors and one pair of flying capacitor terminals for connection to a flying capacitor, the circuit being operable in two modes, wherein in the first mode, the circuit is operable to use the flying capacitor to generate positive and negative output voltages together spanning a voltage approximately equal to the input voltage, and centered on the voltage at the common terminal.

In the second of the modes, the circuit may be arranged to generate positive and negative output voltages each up to substantially the input voltage.

Also disclosed is an audio apparatus including any charge pump circuit as disclosed herein, the charge pump having a flying capacitor connected to the first and second flying capacitor terminals and first and second reservoir capacitors connected respectively between the first output terminal and the common terminal and the second output terminal and the common terminal, the audio apparatus further comprising audio output circuitry connected to be powered by the first and second output voltages of the converter. The audio apparatus may be portable. The audio apparatus may be comprised within a communications apparatus The audio apparatus may be an in-car audio apparatus. The audio apparatus may be comprised within a headphone apparatus or a stereo headphone apparatus. The audio apparatus may include an audio output transducer connected as a load connected to an output terminal of the audio output circuitry.

Further optional features of the invention are as disclosed in the appended claims.

BRIEF DESCRIPTION OF THE DRAWINGS

Embodiments of the invention will now be described, by way of example only, by reference to the accompanying drawings, in which:

FIG. 1 shows a prior art inverting charge pump circuit;

FIG. 2a shows the same circuit as FIG. 1 with detail of the switch array shown;

FIGS. 2b and 2c show equivalent circuits of the circuit of FIG. 2a, in two states used in operation;

FIGS. 9a and 9b show, respectively, the circuit with the switch array in a sixth state and an equivalent circuit of this state;

FIGS. 10a and 10b show, respectively, the circuit with the switch array again in the second state and an equivalent circuit of this state;

DETAILED DESCRIPTION OF THE EMBODIMENTS

Figure 3:
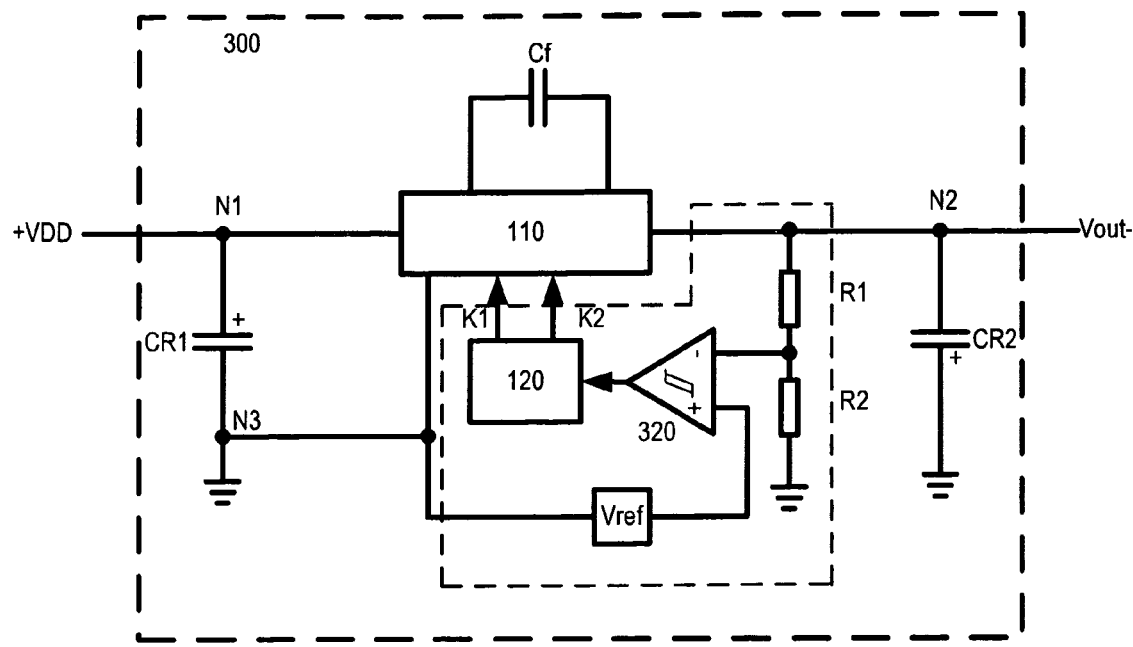
FIG. 3 shows a variation on the circuit of FIG. 1, operating in a closed loop configuration.

FIG. 1 illustrates a prior art inverting charge-pump (ICP) circuit 100 which generates a negative output voltage (Vout−) from a positive input voltage (+VDD). In ideal conditions Vout− will substantially equal −VDD thus resulting in a total voltage across the nodes N1-N2 of 2×VDD. The circuit 100 comprises three capacitors, one flying capacitor Cf and two reservoir capacitors CR1, CR2, and a switch array 110. Circuit 100 is controlled by a controller 120 which controls the switch array 110 thus causing circuit 100 to switch between two main states as explained below.

FIG. 2a illustrates the switch array 110 associated with the ICP circuit 100. FIGS. 2b and 2c show equivalent circuits for the two main charging/discharging states of operation. Switches SA1 and SA2 and switches SB1 and SB2 are arranged as shown and respectively operated by common control signals (CSA and CSB).

To generate the voltage Vout−, the controller operates the switch array 110 to repeat the following four steps:

1. initially all the switches are open; then
2. switches SA1 and SA2 are closed (SB1 and SB2 remain open) resulting in the ICP circuit 100 operating in a first state. The flying capacitor Cf is connected between the input voltage node N1 and the common reference voltage node N3 (as illustrated in FIG. 2b). Therefore the flying capacitor Cf charges up to voltage +VDD; then
3. switches SA1 and SA2 are opened (SB1 and SB2 remain open); then
4. switches SB1 and SB2 are closed (SA1 and SA2 remain open) resulting in the ICP circuit 100 operating in a second state. The flying capacitor Cf is now connected in parallel with the negative reservoir capacitor CR2, that is its connected across the common reference voltage node N3 and the output voltage node N2 (as illustrated in FIG. 2c). Assuming capacitor CR2 is initially charged to zero volts in this first cycle, capacitor CR2 will share charge with capacitor Cf, to give an equal voltage across each capacitor. Since the positive plates of capacitors Cf and CR2 are connected to the common reference voltage node N3 (ground), node N2 sees a voltage somewhat more positive than −VDD relative to node N3, depending on the respective sizes of Cf and CR2.

The process repeats itself starting at step 1 when all the switches are open. In each 4-step cycle, capacitor CR2 will be further charged, eventually reaching a steady state after a plurality of 4-step cycles. By this time, capacitor CR2 is already charged to (and therefore Vout− equals) substantially −VDD, and consequently Cf no longer adds any further significant charge.

The switch array 110 may be operated in an open-loop configuration as described above where the switching frequency of the switches is substantially fixed. The actual switching frequency can be made dependent upon the application in which the circuit is being used and can be of the magnitude of KHz to MHz, for example.

If a load is applied to Vout−, it will continuously discharge capacitor CR2. This charge is then replaced by charge from capacitor Cf during state 2, resulting in Vout− being somewhat more positive than −VDD. The average difference and voltage ripple will depend on the values of Cf, CR2, the switching frequency and the load characteristics.

FIG. 3 shows an alternative prior art ICP circuit 300 in which the switch array 110 is operated in a closed-loop configuration. This alternative prior art ICP circuit 300 differs from that illustrated in FIG. 1 in having its switch array control logic 310 dependent on output voltage Vout−. The ICP circuit 300 comprises a voltage divider R1, R2 and a comparator 320, as well as the switch array 110 and capacitors Cf, CR1, CR2 as before. Regulation of the output voltage Vout− on node N2 is achieved by sensing the output voltage Vout− through the internal resistor divider R1, R2 and enabling the switch array 110 when the voltage Vout− across capacitor CR2 becomes more positive than the comparator's 320 reference input Vref. When the switch array 110 is enabled, 2-phase non-overlapping clock signals K1, K2 control the switches (not illustrated). One clock signal (K1) controls switches SA1 and SA2 which enables the flying capacitor Cf to charge up to the input voltage +VDD (see FIG. 2b), while the other clock signal (K2) controls switches SB1 and SB2 which enables the output reservoir capacitor CR2 to charge up to voltage Vout− (see FIG. 2c).

It should be noted that the output voltage Vout− can be regulated such that it is anywhere between approximately ground potential and −VDD, however the charge pump itself is most efficient when the output voltage Vout− equals −VDD. In practice the target voltage will probably be set slightly above −VDD in order to reduce ripple.

The problem associated with these prior art ICP circuits (100, 300) is that they can only generate output voltages that have a rail-to-rail magnitude greater than the input voltage. This can be disadvantageous in certain applications, as it may not allow the circuitry being supplied to run efficiently, for example when such an ICP circuit (100, 300) is being used to power circuitry that amplifies a signal with a maximum amplitude much smaller than the amplifier circuitry's power supply +/−VDD.

Figure 4A:
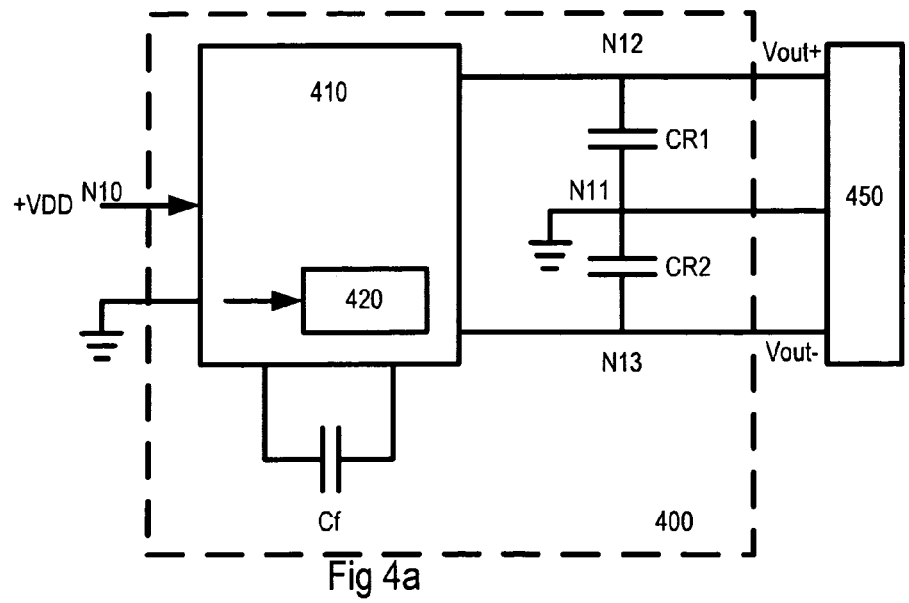
FIG. 4a shows a Dual Mode Charge Pump circuit according to an embodiment of the invention.

FIG. 4a illustrates a novel dual mode charge-pump (DMCP) circuit 400 which comprises three capacitors—one flying capacitor Cf and two reservoir capacitors CR1, CR2—and a switch array 410. Circuit 400 is controlled by a controller 420 which controls the switch array 410 thus causing circuit 400 to switch between various states to implement the different modes of operation, as explained below. Clock signals (not shown) are provided to the controller, which may be generated within DMCP 400 or shared with other circuitry on chip. The circuit 400 in operation uses flying capacitor Cf to transfer packets of charge from an input supply to the reservoir capacitors at high frequency, in such a way as to generate positive and negative output voltages (Vout+ & Vout−) from a positive input voltage (+VDD). The values of these output voltages depend on the mode selected. To aid explanation, various circuit nodes are labelled, including node N10 connected to receive the input supply voltage VDD, node N11 being a common (ground) node and nodes N12 and N13 forming the output terminals for Vout+ and Vout− respectively.

Connected to the outputs Vout+, Vout−, and N11 (0V) is a load 450. In reality this load 450 may be wholly or partly located on the same chip as the power supply, or alternatively it may be located off-chip. Example applications will be described with reference to FIGS. 23 to 25 below.

As its name implies, DMCP 400 is operable in two main modes. These modes will be explained in more detail below. Naturally the principles of the dual mode circuit can be extended to multiple modes.

In the first main mode, referred to below as Mode 1, the DMCP 400 operates such that, for an input voltage +VDD, the DMCP 400 generates outputs each of a magnitude which is a half of the input voltage VDD. In other words, the output voltages generated in this first mode are nominally of magnitude +VDD/2 and −VDD/2. When lightly loaded, these levels will, in reality, be +/−(VDD/2-Iload.Rload), where Iload equals the load current and Rload equals the load resistance. It should be noted that, in this case, the magnitude (VDD) of output voltage across nodes N12 & N13 is the same, or is substantially the same, as that of the input voltage (VDD) across nodes N10 & N11, but shifted. This mode may therefore be referred to as a 'level shifting' mode. In the second main mode (Mode 2) the DMCP 400 produces a dual rail output of +/−VDD.

This particular form of charge pump has significant advantages over known circuits, in particular because of the ability to generated a reduced, bipolar supply using only a single flying capacitor. Prior circuits for generating reduced output voltages requires additional flying capacitors. The flying capacitor and reservoir capacitors are often of a size that they need to be located off-chip, and so eliminating one capacitor and two IC pins is highly beneficial. The present invention not to be taken as being limited in its application to the particular form of DMCP illustrated here, however, and is potentially applicable in other multi-mode charge pump circuits whether they be known or, as yet, unknown.

Figure 4B:
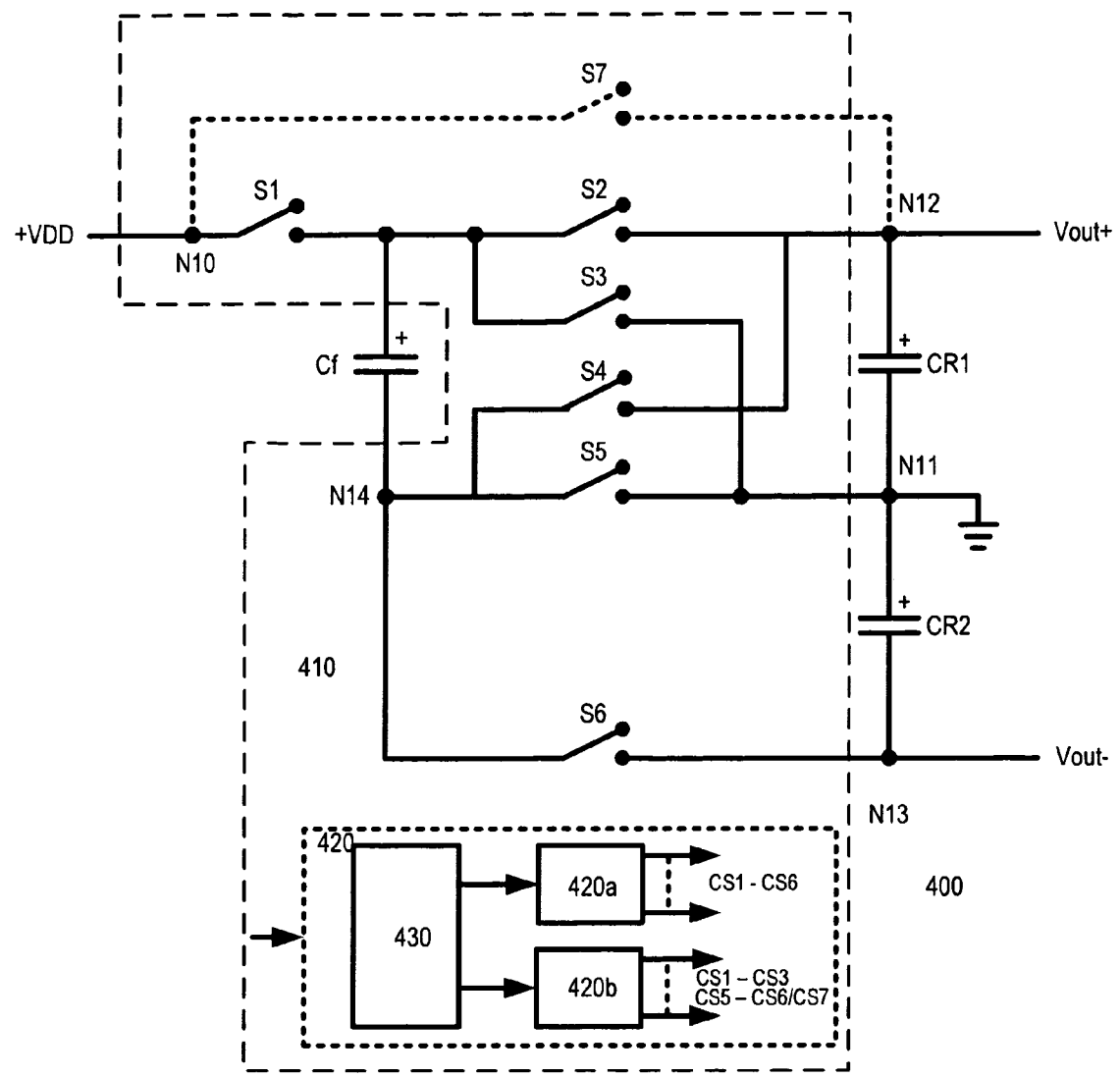
FIG. 4b shows the same circuit as FIG. 4a with internal detail of the charge pump switch array and control module.

FIG. 4b shows more internal detail of the DMCP 100. Here it can be seen that the switch array 410 comprises six main switches S1-S6 each controlled by corresponding control signal CS1-CS6 from the switch control module 420. The switches are arranged such that first switch S1 is connected between the positive plate of the flying capacitor Cf and the input voltage source, the second switch S2 is between the positive plate of the flying capacitor and first output node N12, the third switch S3 is between the positive plate of the flying capacitor and common terminal N11, the fourth switch S4 is between the negative plate of the flying capacitor and first output node N12, the fifth switch S5 is between the negative plate of the flying capacitor and common terminal N11 and the sixth switch S6 is between the negative plate of the flying capacitor and second output node N13. Optionally, there may be provided a seventh switch S7 (shown dotted), connected between the input voltage source (node N10) and first output node N12. These switches are the ones appropriate to the modes to be described. The provision of further switches to enable other modes of operation is of course not excluded.

It should be noted that the switches can be implemented in a number of different ways (for example, MOS transistor switches or MOS transmission gate switches) depending upon, for example, an integrated circuit's process technology or the input and output voltage requirements. The selection of appropriate implementations is well within the capability of the skilled reader.

Also shown in greater detail is the control module 420 which, at least notionally, comprises mode select circuit 430 for deciding which of two control functions 420a, 420b to use, thus determining which mode the DMCP operates in. The mode select circuit 430 and the controllers 420a, etc. are notional blocks in that they represent different behaviours of the control module in implementing different operating modes of DMCP 400. They can be implemented by separate circuits as just described. In practice, they are just as likely to be implemented by a single circuit block or sequencer with hardwired logic and/or sequencer code determining which behaviour is implemented at a given time. As also described below, where a given mode can be implemented in a range of variants, the designer may select variants which simplify the generation of the control signals, when all the different modes are considered together.

DMCP Operation—Mode 1

In a main operational embodiment of Mode 1, there are three basic states of operation, repeated in high-frequency cycles of three phases, which may be referred to as P1, P2, P3. When DMCP 400 is operating in Mode 1, switch S7, where present, is always open and is therefore not shown when describing this mode.

Figure 5A:
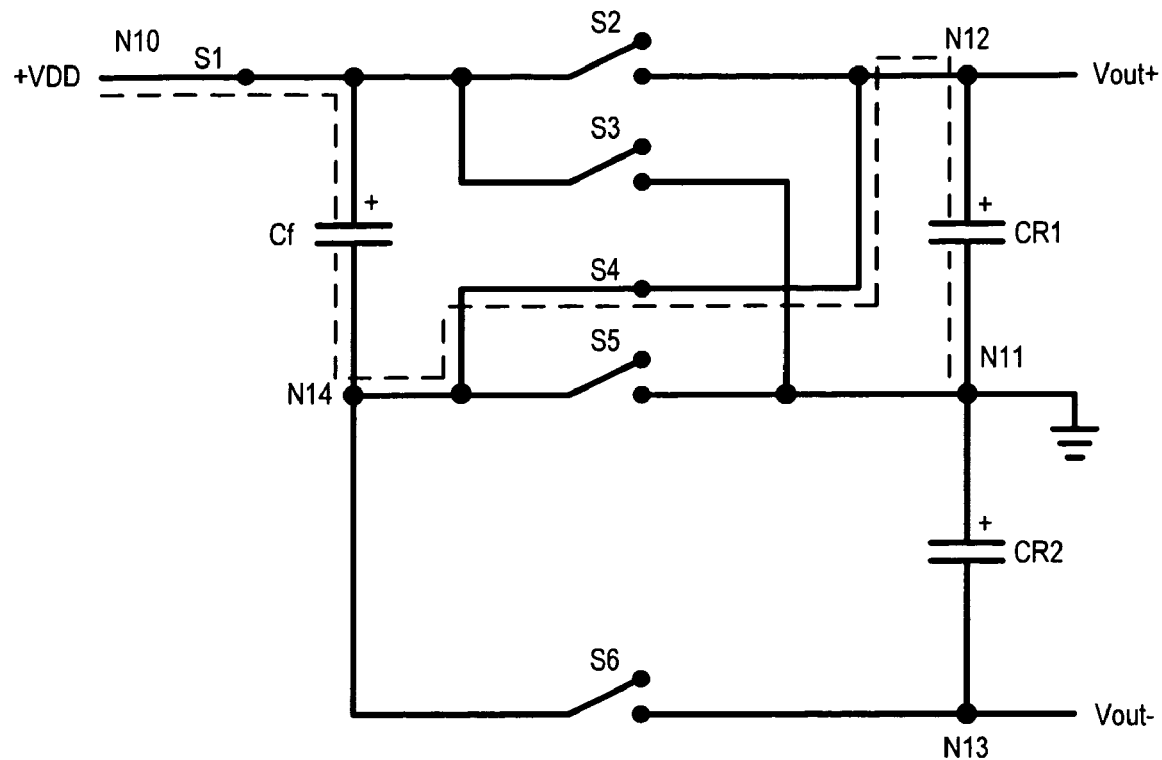
FIGS. 5a and 5b show, respectively, the circuit with the switch array in a first state and an equivalent circuit of this state.
Figure 5B:
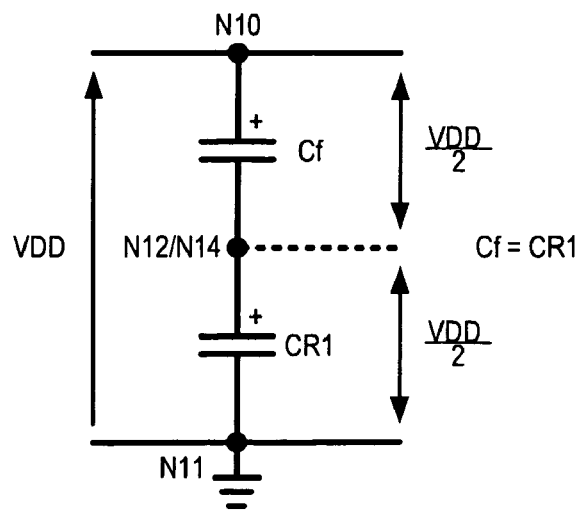

FIGS. 5a and 5b show the switch array 410 operating in a first state, "State 1". Referring to FIG. 5a, switches S1 and S4 are closed such that capacitors Cf and CR1 are connected in series with each other and in parallel with the input voltage +VDD. Therefore, capacitors Cf and CR1 share the input voltage +VDD that is applied across them. FIG. 5b shows an equivalent circuit for the state 1 operation with voltage +VDD effectively applied across nodes N10 & N11.

It is preferable for applications that require symmetrical, but opposite polarity, output voltages, that the values of capacitors Cf and CR1 are equal such that each capacitor Cf, CR1 changes voltage by an equal increment when connected in series across a voltage source. If both capacitors are initially discharged, or indeed previously charged to any equal voltages, they will end up each with a voltage equal to half the applied voltage source, in this case one half of the input voltage VDD.

Figure 6A:
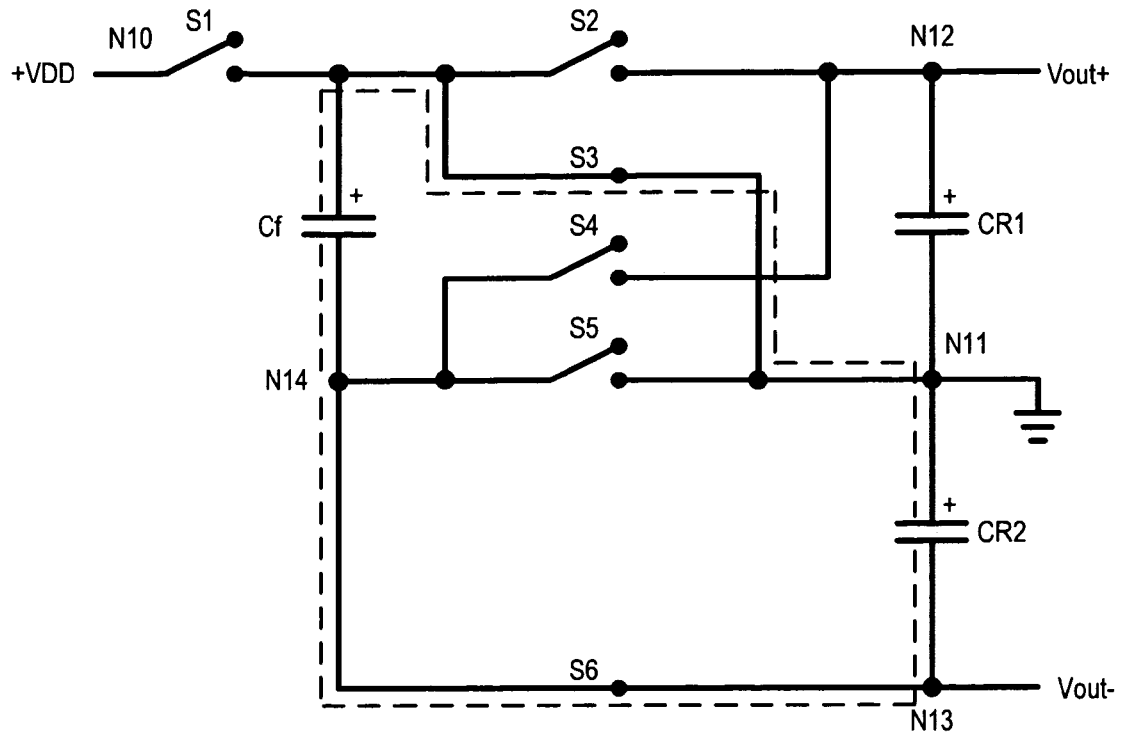
FIGS. 6a and 6b show, respectively, the circuit with the switch array in a second state and an equivalent circuit of this state.
Figure 6B:
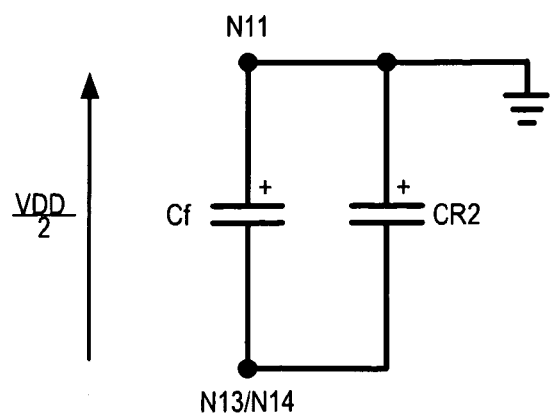

FIGS. 6a and 6b show the switch array 410 operating in a second state, "State 2". Referring to FIG. 6a, switches S3 and S6 are closed such that capacitors Cf and CR2 are connected in parallel with each other and between nodes N11 and N13.

Therefore, the voltage across capacitor Cf equalises with that across capacitor CR2. FIG. 6b shows an equivalent circuit for this State 2 condition.

It should be noted that the value of reservoir capacitor CR2 does not necessarily need to be the same as that of flying capacitor Cf. If capacitor CR2 is much larger than capacitor Cf, it will require more cycles to charge up to or close to VDD/2. The value of reservoir capacitor CR2 should be chosen depending upon expected load conditions and required operating frequency and output ripple tolerance.

Over a plurality of cycles alternating only States 1 and 2, the voltages across the capacitors Cf and CR2 would, under ideal conditions, converge to a voltage +/−VDD/2. However, the presence of a significant load on the charge pump's output terminals will result in a respective voltage droop in Vout+, Vout− away from +/−VDD. If the load is symmetric, and there is equal current magnitude on both Vout+ and Vout−, then the symmetry of the system will result in both outputs drooping by the same amount.

However, if, for example, there is a significant load on Vout+ but no load or a light load on Vout−, then the voltage across capacitor CR1 will reduce. This will result in a larger voltage across capacitor Cf at the end of State 1 which will then be applied to capacitor CR2 in State 2. If only States 1 and 2 were used, the flying capacitor Cf would then be connected in series with capacitor CR1 in State 1 but still having a larger voltage across it, even initially. Therefore, voltages Vout+ and Vout− will both tend to droop negatively, that is to say that the common mode is not controlled.

Figure 7A:
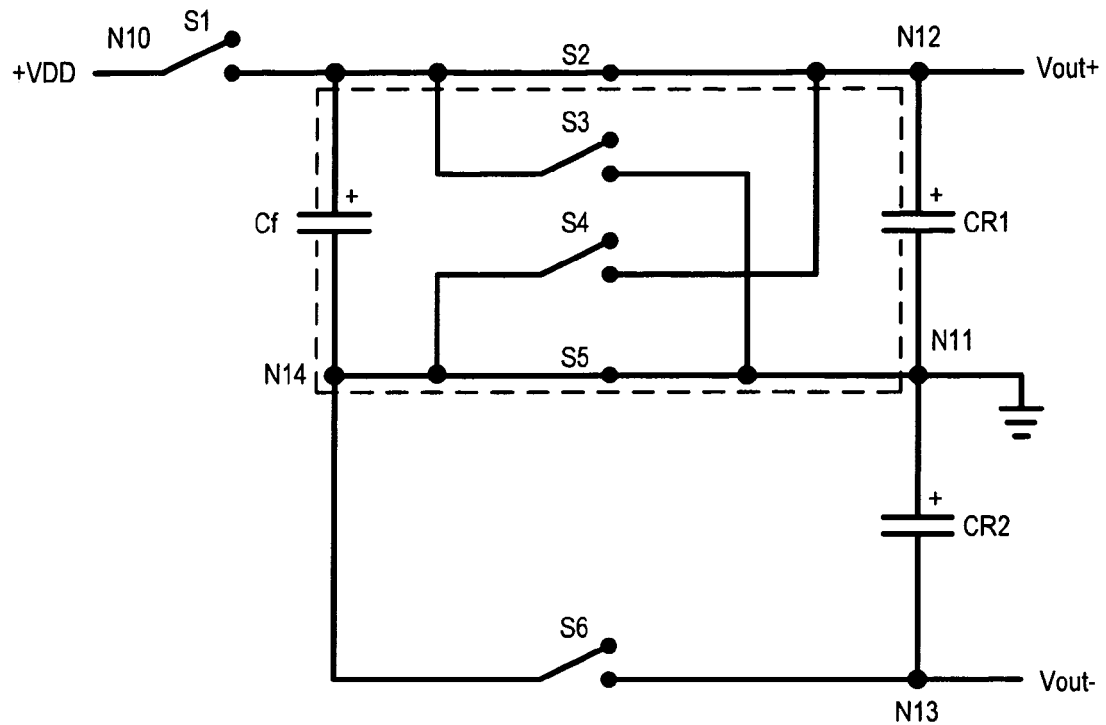
FIGS. 7a and 7b show, respectively, the circuit with the switch array in a third state and an equivalent circuit of this state.
Figure 7B:
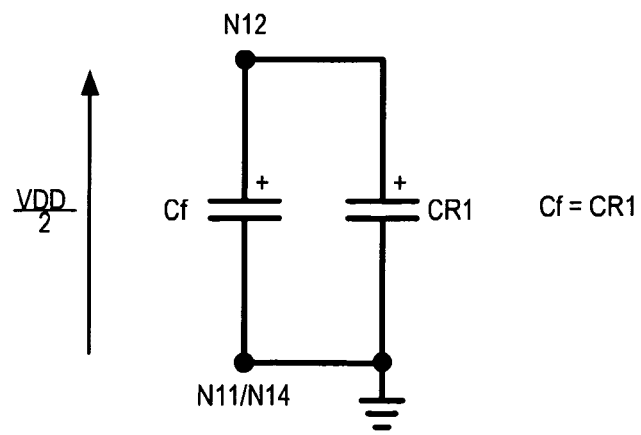

To avoid this effect, a third state, State 3, is introduced, and States 1 to 3 are repeated in Phases 1 to 3 over successive cycles. FIGS. 7a and 7b show the switch array 410 operating in this State 3 operation. Referring to FIG. 7a, in State 3, switches S2 and S5 are closed such that capacitors Cf and CR1 are connected in parallel with each other and between nodes N11 and N12. Therefore, both capacitors Cf and CR1 become charged up to an equal voltage, despite any difference between of their previous voltages. In steady state (after many cycles) this becomes approximately VDD/2. FIG. 7b shows an equivalent circuit for this State 3 condition.

The circuit, therefore ends State 3 with equalised voltages, after which it returns to State 1. Consequently the circuit will, in principle, enter Phase 1 of the next cycle in State 1 with Vout+=+VDD/2, depending upon load conditions and switching sequence.

In States 2 and 3, the voltages across the various capacitors that are connected in parallel may not actually, in practice, completely equalise in a single sequence, particularly if the switching frequency is high, relative to the DMCP's R-C time constant. Rather, in each sequence of states a contribution of charge will be passed from capacitor to capacitor. This contribution will bring each output voltage to the desired level under zero, or low, load conditions. Under higher load conditions, the output reservoir capacitors CR1, CR2 will typically achieve a lower voltage (with some ripple). The size of each of the capacitors needs simply to be designed such that the reduction of common mode drift is within acceptable bands, for all expected load conditions, Alternatively, or in addition, larger switches, with less on-resistance, could be employed.

Figure 8:
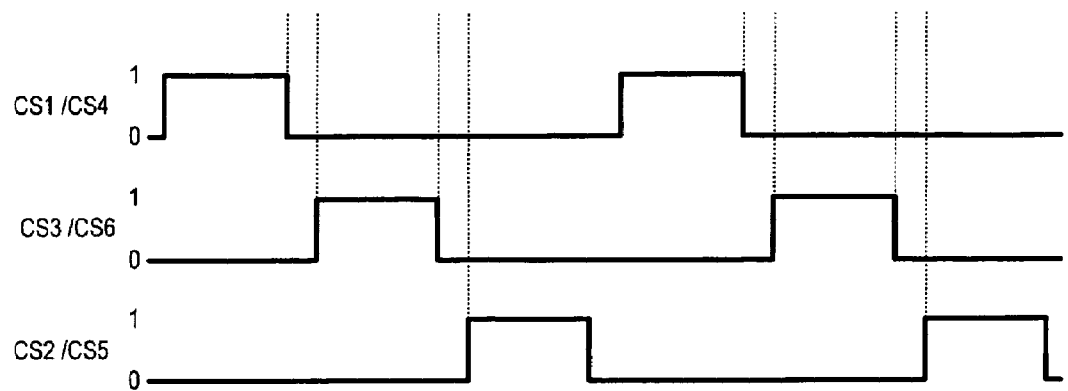
FIG. 8 is a timing diagram showing three switch control signals for the circuit of FIGS. 1 and 2 operating in a first main mode (Mode 1)

FIG. 8 illustrates the non-overlapping control signals (CS1-CS6) for controlling the switches (S1-S6) during the three states (1, 2 and 3) of the main operational embodiment of Mode 1. As discussed above, this represents only one example out of many possibilities for the controlling sequence.

It should be appreciated that the open-loop sequencing of the above three states does not necessarily need to be observed. For example the state sequences could be: 1, 2, 3, 1, 2, 3 . . . (as described above); or 1, 3, 2, 1, 3, 2 . . . ; or 1, 2, 1, 3, 1, 2, 1, 3. It should also be apparent that it is not necessary that the third state be used as often as the other two states, for instance a sequence of 1, 2, 1, 2, 1, 2, 3, 1 . . . can be envisaged. It may even be envisaged to dispense with the third state altogether, albeit only in the case of well-balanced loads, or with alternative schemes for common-mode stabilisation.

Other switching and sequencing scenarios exist. For example, in one alternative operational Mode 1 embodiment: State 1 could be replaced by a fourth state, "State 4" whereby switches S1 and S5 are closed (all other switches are open). In this state capacitor Cf charges up to input voltage +VDD. A fifth state, "State 5" would then operate with switches S2 and S6 closed (all other switches open) such that flying capacitor Cf is connected across reservoir capacitors CR1 and CR2 in series (which, in this scenario, may be equal in capacitance). This particular example of an alternative switching and sequencing scenario has the drawback that there is no common-mode control and therefore would suffer from common-mode drift. However, this common-mode drift can be "reset" by altering the switching sequence at appropriate intervals during the "normal" switching and sequencing cycle. These alterations can be predetermined, or initiated in response to observed conditions.

It should be noted that the sizes of capacitors Cf, CR1, CR2, can be selected to meet the required ripple tolerances (versus size/cost) and consequently the clock phase duration for each state need not necessarily be of ratio 1:1:1.

While the above describes an embodiment wherein Mode 1 generates outputs of +/−VDD/2, it will be understood by the skilled person that the above teaching could be used to obtain outputs of any fraction of VDD by increasing the number of flying capacitors Cf and altering the switch network accordingly. The relationship between output and input in this case is Vout+/−=+/−VDD/(n+1) where n equals the number of flying capacitors Cf. It will also be appreciated that circuits with more than one flying capacitor as described will still be capable of generating outputs of +/−VDD/2 as well as outputs for every intermediate integer denominator between +/−VDD/2 and +/−VDD/(n+1) depending on its control. For example, a circuit with two flying capacitors can generate outputs of VDD/3 and VDD/2, one with three flying capacitors can generate outputs of VDD/4, VDD/3 and VDD/2 and so on.

DMCP Operation—Mode 2

As mentioned above, the DMCP is also operable in a second main mode, Mode 2, where it produces a dual rail output of +/−VDD (+VDD again being the input source voltage level at node N10). In Mode 2, switch S4 is always open.

Several variations of Mode 2 are possible, which will be described below and referred to as Modes 2(a), 2(b), 2(c) and 2(d). Optional switch S7 is required for Modes 2(c) and (d). 2(a).

Figure 9A:
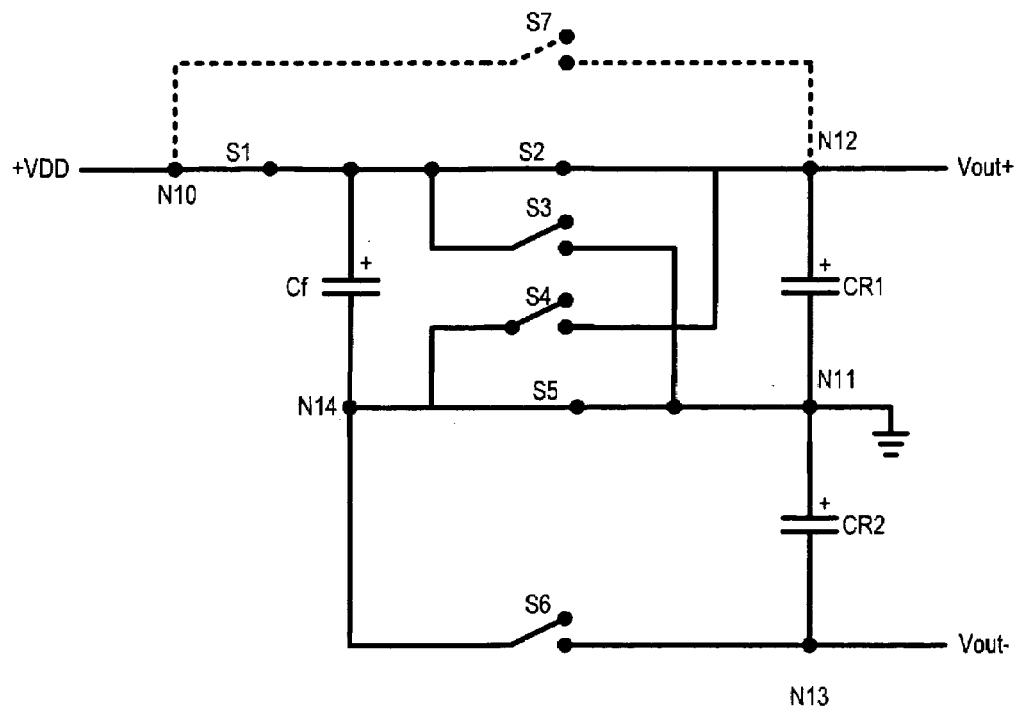
Figure 11:
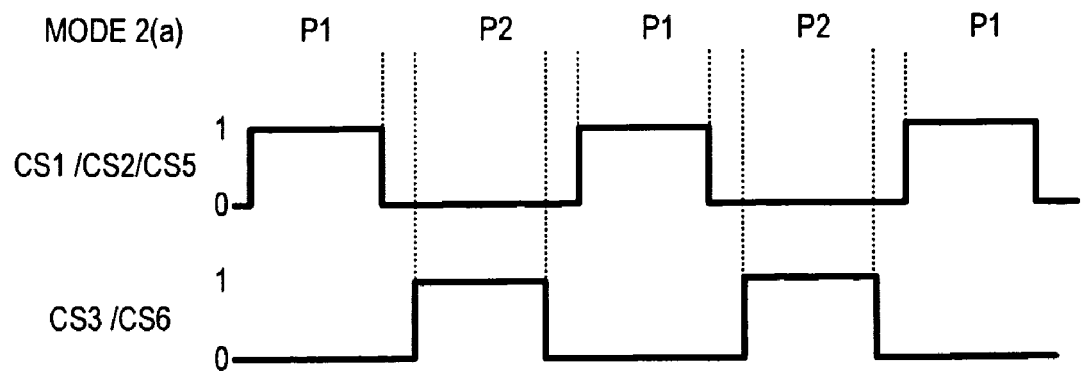
FIG. 11 is a timing diagram showing control signals in a first variant of a second main mode of operation (Mode 2(a))

In Mode 2(a) the DMCP has two basic states of operation. FIG. 9a shows the circuit operating in the first of these states, "State 6". In this state, switches S1, S2 and S5 are closed (S3, S4 and S6 are open). This results in capacitors Cf and CR1 being connected in parallel across the input voltage +VDD, between nodes N10 & N11. Therefore, capacitors Cf and CR1 each store the input voltage +VDD. FIG. 9b shows an equivalent circuit for the State 6.

FIG. 10a shows the circuit operating in the second of these states, which is in fact the same state as State 2 in Mode 1, whereby switches S3 and S6 are closed (S1, S2, S4 and S5 are open). Therefore capacitors Cf and CR2 are connected in parallel between common node N11 and second output node N13. Therefore, capacitors Cf and CR2 share their charge and Node 13 exhibits a voltage of −VDD after a number of cycles. FIG. 10b shows an equivalent circuit for this State 2.

Figure 12A:
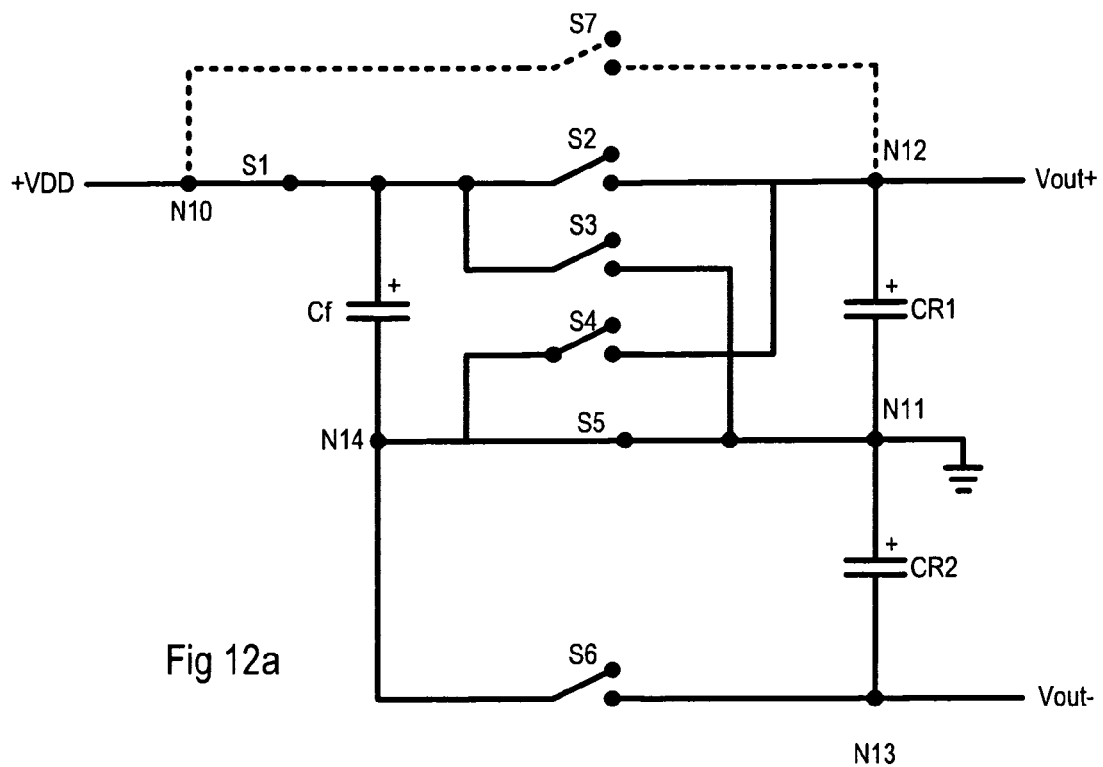
FIGS. 12a and 12b show, respectively, the circuit with the switch array in a seventh state and an equivalent circuit of this state.

FIG. 12a shows an additional state, "State 7", which can be introduced into this Mode 2(a) sequence to create a slightly different implementation, referred to now as Mode 2(b). In State 7, switches S1 and S5 are closed (S2, S3, S4 and S6 are open). This State 7 connects the flying capacitor Cf across the input voltage +VDD.

Figure 12B:
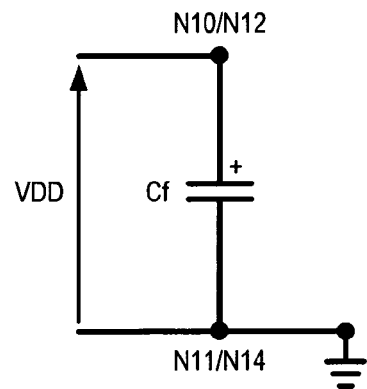

This state can be followed by States 6 then 2 and then back to 7 etc. FIG. 12b shows an equivalent circuit for this State 7.

Figure 13:
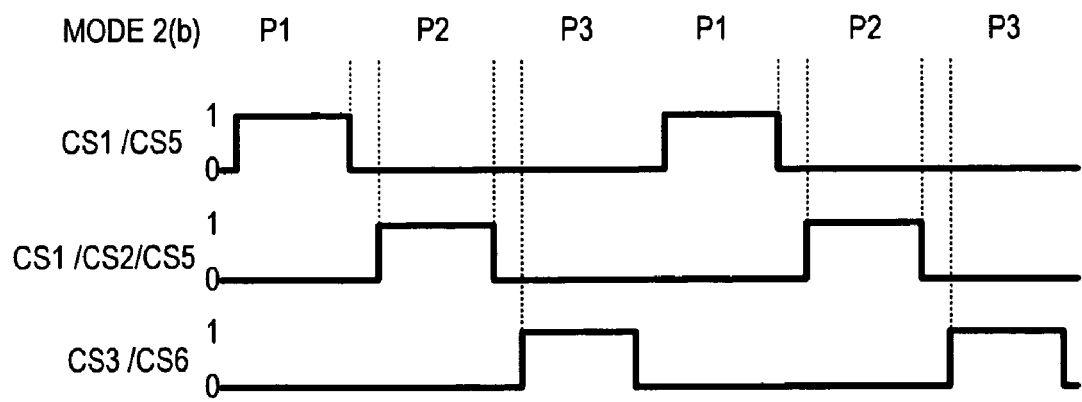
FIGS. 13, 14 and 15 are timing diagrams showing switch control signals in second, third and fourth variants of the second main mode of operation (Mode 2(b), 2(c), 2(d) respectively)

FIG. 13 illustrates the non-overlapping control signals (CS1-CS3 & CS5-CS7) for controlling the switches (S1-S3 and S5-S7) to generate a repeating sequence of the three states 7, 6, 2, 7, 6, 2, etc. . . . that defines Mode 2(b). Again, this represents only one example out of many possibilities for the controlling sequence. The inclusion of State 7 before State 6 is intended to isolate CR1 from the influence of CR2, and hence combat cross-regulation. On the other hand, the inclusion of State 7 reduces the time available for charge transfer in the main States 2 and 6, so that regulation as a whole may be improved if State 7 is simply omitted (Mode 2(a)). These are design choices.

Whichever pattern is chosen, one of the states may be used less frequently than the others (as was described above in relation to Mode 1). For instance, if the loads on the two output nodes N12, N13 are unbalanced (either permanently or according to signal conditions), one of the States 6 and 2 could be included less frequently than the other, as capacitor CR1 may need to be charged less frequently than capacitor CR2 or vice versa.

Modes 2(c) and (d) are further alternative modes of operation to generate +/−VDD, which are possible when the DMCP is provided with switch S7. This switch may used to replace the combined functionality of switches S1 and S2 for generating the positive output voltage at node N12 in applications where the high-side load, i.e. the load connected between nodes N12 and N11, does not require a lot of current. This may be where the load has a high input resistance as with a "Line Output" for a mixer for example. In such a case the size and the drive requirements of switch S7 can be reduced and modified compared to those of switches S1 and S2. Indeed, switch S7 can be constantly switched on during operation in Mode 2(c) which has advantages in that there is less power required to drive the switches and switch S7 would not, in the case of a MOS switch implementation, inject any charge into either nodes N10 or N12 due to its parasitic gate-drain and gate-source capacitances. It should also be noted that switch S1 is still required to operate so as to generate the negative output voltage −VDD. Still further, it should be noted that switch S2 may be operated on an infrequent basis so as to also connect the flying capacitor Cf and high-side reservoir capacitor CR1 in parallel.

Figure 14:
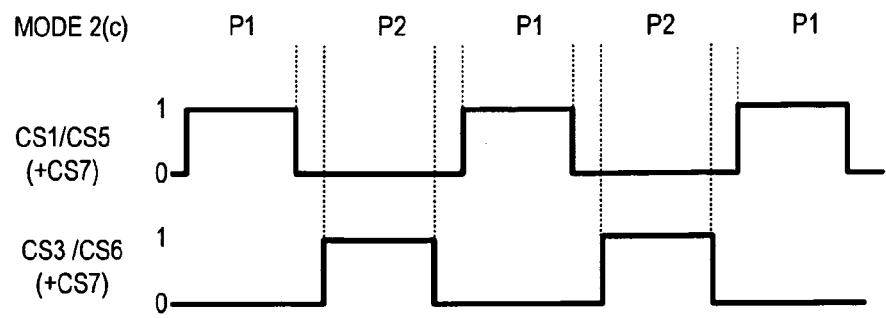

FIG. 14 illustrates the non-overlapping control signals (CS1-CS3 & CS5-CS7) for controlling the switches (S1-S3 and S5-S7) during the two alternating states of Mode 2(c). Summarising Mode 2(c), therefore, switch S7 is permanently (or near permanently) closed. A modified State 6 is used to charge the flying capacitor Cf and capacitor CR1 in parallel, this now being achieved by having switches S1, S5 and S7 closed only. A modified State 2 is then used to transfer this charge to capacitor CR2 via switch S3, S6 as before, but this time with capacitor CR1 still having voltage VDD across it due to S7 being closed.

Figure 15:
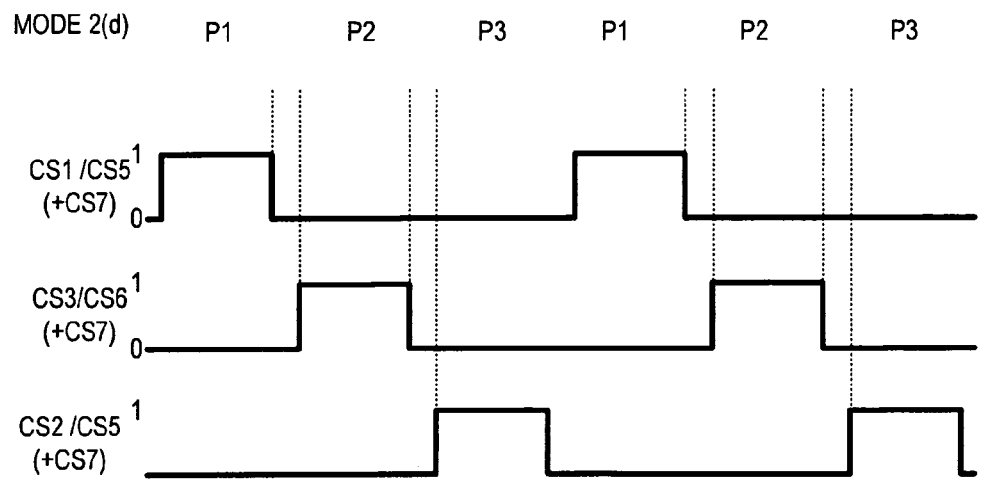

FIG. 15 illustrates non-overlapping control signals (CS1-CS3 & CS5-CS7) for controlling the switches (S1-S3 and S5-S7) during three states in a variation of Mode 2(c) referred to as Mode 2(d). The difference relative to Mode 2(c) is similar to the difference between Modes 2(a) and 2(b), in that an extra phase is inserted with the switches in State 7, wherein switches S1 and S5 are closed (S2, S3, S4 and S6 are open; S7 can remain closed throughout). Note that Mode 2(d) follows a sequence 7, 2, 6, 7, 2, 6 . . . rather than 7, 6, 2. There is not necessarily any great difference in the effect of these modes, but the freedom to vary the sequence can simplify the control logic, as will be seen in the discussion below.

TABLE 1

|  | S1 | S2 | S3 | S4 | S5 | S6 | S7* |
|---|---|---|---|---|---|---|---|
| State 1 | 1 | 0 | 0 | 1 | 0 | 0 | 0 |
| State 2 | 0 | 0 | 1 | 0 | 0 | 1 | 1++ |
| State 3 | 0 | 1 | 0 | 0 | 1 | 0 | 0 |
| State 4 | 1 | 0 | 0 | 0 | 1 | 0 | 0 |
| State 5 | 0 | 1 | 0 | 0 | 0 | 1 | 0 |
| State 6 | 1 | 1 | 0 | 0 | 1 | 0 | 0 |
| State 6+ | 1 | 0 | 0 | 0 | 1 | 0 | 1 |
| State 7 | 1 | 0 | 0 | 0 | 1 | 0 | 0 |
| State 7++ | 1 | 0 | 0 | 0 | 1 | 0 | 1 |

*if present
+Modes 2c and 2d
++Mode 2d

Table 1 illustrates the switch (S1-S7) states for the seven states described above, with a "0" representing an open switch and a "1" representing a closed switch. Note that the switch network and controller do not need to implement all states 1 to 7, if only a subset of the described modes will be used in a particular implementation.

Again, these four example sequences and seven or eight different states of the switch network are not the only possibilities for the controlling sequence. Again, a number of different sequence implementations are possible and some of these states may be used less frequently than others, depending on load.

Figure 16:
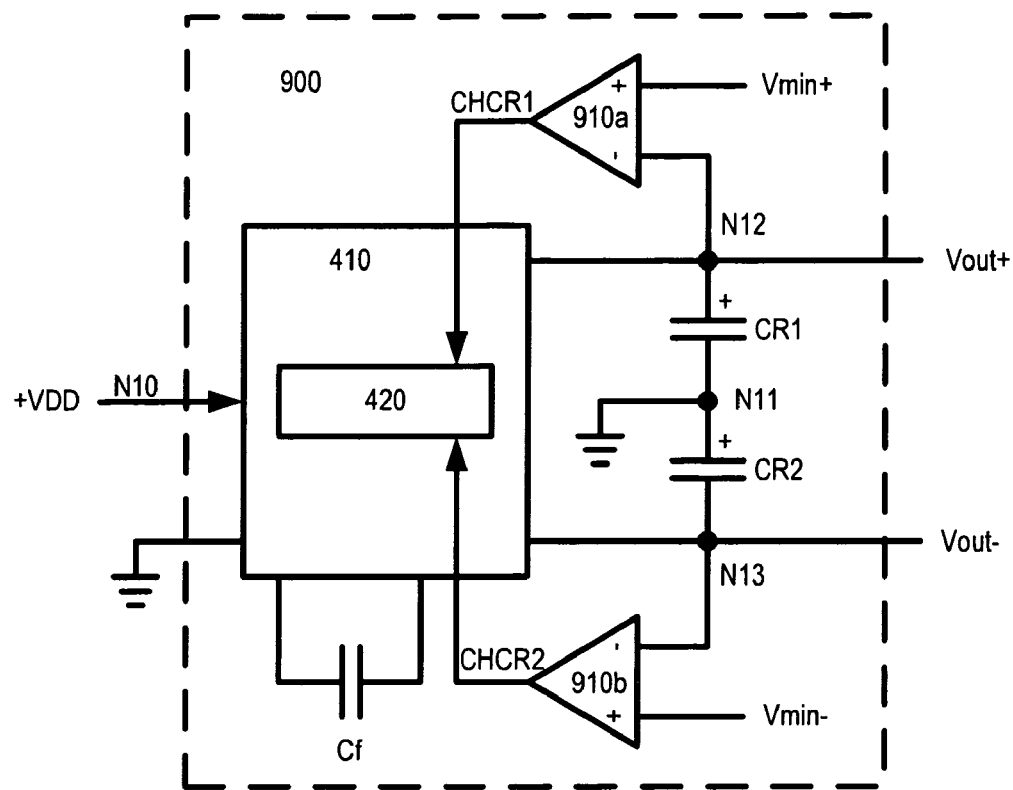
FIG. 16 shows a variation on the circuit of FIG. 4, operable in a closed loop configuration.

FIG. 16 illustrates a similar DMCP 900 circuit as illustrated in FIG. 4 except that the DMCP 900 also includes two comparators 910a, 910b for regulating the two output voltages.

It should be noted that DMCP 900 represents a closed-loop DMCP. Each of the comparators 910a, 910b compares their respective charge pump output voltages (Vout+, Vout−) with a respective threshold voltage (Vmin+, Vmin−) and outputs a respective charge signal CHCR1 and CHCR2. These charge signals CHCR1, CHCR2 are fed into the switch control module 1420 to control the switch array 1410 causing the DMCP to operate charging either the relevant reservoir capacitor. If either output voltage droops past its respective threshold, the charge pump is enabled; otherwise the charge pump is temporarily stopped. This reduces the power consumed in switching the switches, especially in conditions of light load.

This scheme allows output voltages up to +/−VDD/2. It should be further noted that in this configuration, the DMCP 900 may be used to generate higher voltages, but with a drop in efficiency. In this case, the reference voltages (Vmin+/Vmin−) can be adjusted to adjust the output voltages accordingly. The flying capacitor Cf is charged up to +VDD (via switches S1 and S5) and then connected in parallel across either reservoir capacitor CR1 (via switches S2, S5) or CR2 (via switches S3, S6) to raise their voltages to the levels set by the reference voltages. Such an operation increases the ripple voltages on the reservoir capacitors CR1, CR2 but it also reduces switching losses. However, by scaling the reservoir capacitors CR1, CR2 relative to the charging capacitor Cf, the ripple voltages can be reduced.

Figure 17:
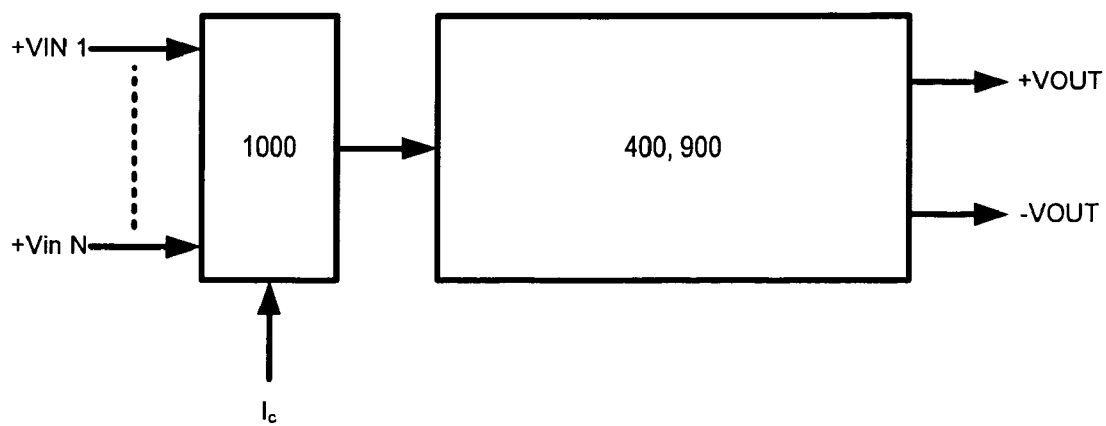
FIG. 17 shows a further embodiment of the invention wherein one of a number of different input voltage values may be selected as an input voltage to any of the Dual Mode Charge Pumps disclosed herein.

FIG. 17 illustrates a further embodiment of any of the novel Dual Mode Charge Pumps 400, 900 described above, wherein one of a number of different input voltage values may be selected as an input voltage to the DMCP 400, 900. It shows an input selector 1000 having a number of different voltage inputs (+Vin 1 to +Vin N), the actual input chosen being determined by control input Ic. The chosen voltage level then serves as the input voltage VDD for the Dual Mode charge pump 400, 900.

Figure 18A:
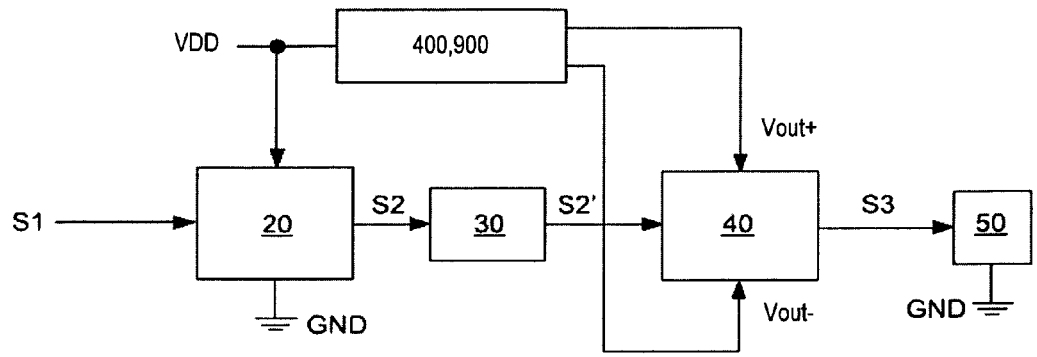
FIGS. 18a and 18b show in block schematic form two amplifier circuits in which any of the Dual Mode Charge Pumps embodying the present invention may be used.

FIG. 18a represents a typical application wherein dual rail supply voltages Vout+ and Vout− are generated by such a charge pump 400, 900, as herein described, the charge pump 400, 900, being supplied from a single rail supply voltage VDD for example. Alternatively, the charge pump 400, 900, may be supplied by multiple supply voltages as illustrated in FIG. 17. Labels VDD, Vout+ etc. are to be interpreted in the description associated with FIGS. 18a, and 18b, to refer to either the respective terminals or the voltage at that terminal, according to context.

Referring to FIG. 18a, the supply voltage VDD is illustrated as supplying processing circuitry 20. The input signal S1 maybe an analog signal or a digital signal. In the case where S1 is an analog signal then the processing circuitry 20 will be purely analog type circuitry such as op-amps, multiplexers, gain blocks etc. In the case where S1 is a digital signal and the output stage is analog, then the processing circuitry 20 may be a mixture of digital and analog circuitry where signal S1 is fed, either directly or through some digital signal processing, into a DAC (not illustrated) and the output of the DAC is then fed into the analog circuitry as mentioned above.

The processing circuitry 20 outputs a processed signal S2 that in this particular embodiment is an analog signal that is passed into a level shifter 30. Level shifter 30 may be implemented by a DC-blocking capacitor for example. An output amplifier 40 is powered by the dual rail supply voltages Vout+ and Vout− generated by the charge pump 400, 900, and may, in particular embodiments, be at levels +/−VDD/2 or +/−VDD depending on the charge pump's 400, 900, mode of operation. The mode of operation of charge pump 400, 900, is determined by control signal Cnl. Mode 1 may be used to drive a low impedance load such as headphones while Mode 2 may be used to drive a high impedance load such as a line output. Mode selection may be carried out manually such as by a volume setting level or code, for example, or alternatively by automatically sensing the output impedance or output current supply or even jack socket versus docking station operation in the case of a portable audio device. In the case of using the volume control to "Mode select", setting the charge pump to Mode 2 should the volume be set high will under normal circumstances cause the output supply voltages to collapse due to the fact that the load's power requirements are greater than that which the charge pump 400, 900, has been designed for. Nevertheless, safeguards (for example, to protect against ear damage as a result of dangerously high volumes), in the form of extra circuitry (not illustrated), can be put in place to monitor for such a situation so as to disable the charge pump 400, 900, or another part(s) of the circuitry.

The input signal S1, if analog, and analog signals in the processing circuitry 20, will normally be referenced midway between ground potential and VDD, whereas the level shifted signal S2' is referenced about ground, as required by the output amplifier operating from the split rail supply Vout+, Vout−.

The level shifted signal S2' is fed into the output amplifier 40 which outputs an amplified output signal S3 which is fed into a ground referenced load in the form of signal transducer 50. In the case where the output amplifier 40 is a switching (Class D or PWM) amplifier, or a 1-bit digital (sigma-delta) type output stage, the signals S1, S2 may be digital in form right through to input to output, or may begin in analog form and be converted to digital form in the processing circuit 20.

Figure 18B:
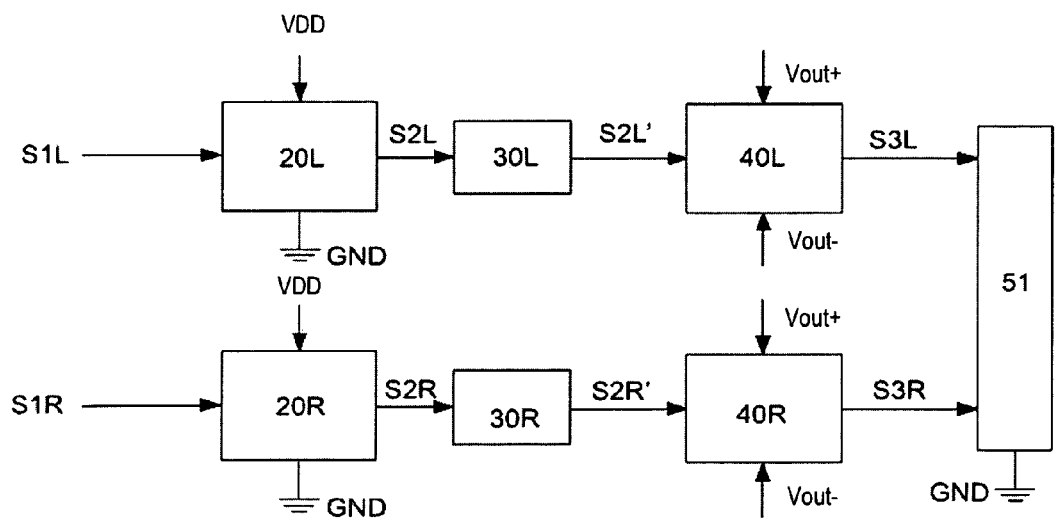

FIG. 18b illustrates a more specific application of the arrangement of FIG. 18a: the charge pump 400, 900, and supply connections have been omitted for clarity. The application in this example is a stereo amplifier in which the load is a stereo headphone 51. The signal processing elements of the amplifier are duplicated to process left and right channel signal, as indicated by the suffixes 'L' and 'R' on their reference signs. The supply voltages Vout+ & Vout− can be shared by both channels, although independent supplies for different channels would be possible if the application demands it. One area of application is in portable audio apparatus such as MP3 players for example where the split rail supply allows a DC-coupled output, which is desirable to maintain the bass response without having to use large decoupling capacitors.

Figure 19A:
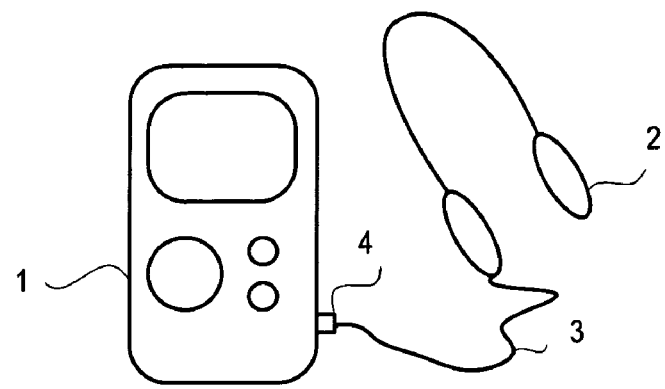
FIGS. 19a to 19c show a portable audio apparatus in different modes of operation.
Figure 19B:
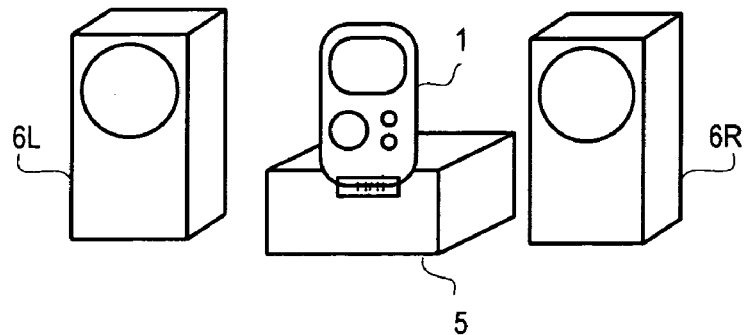

FIGS. 19a and 19b show a portable electronic apparatus being used in two arrangements, whereby any of the DMCP embodiments above could be applied advantageously to provide power to the output stage at appropriate levels for each arrangement.

FIG. 19a shows a portable electronic audio apparatus 1 in the first arrangement, connected to drive a pair of headphones 2. Apparatus 1 in the illustration is an MP3 player, but the same functions may be integrated into phones and multimedia players, laptop computers, PDAs and the like. Headphones 2 are connected to the apparatus via a lead 3 plugged into output jack 4. The body of the apparatus may also include one or more miniature loudspeakers (not shown), which can be driven as an alternative audio output transducer, but are in principle equivalent to the headphones for the purpose of this description. As is well known, small size and weight, together with maximum battery life, are key attributes of premium products in this market. Manufacturing cost is an important factor across the market.

Figure 19C:
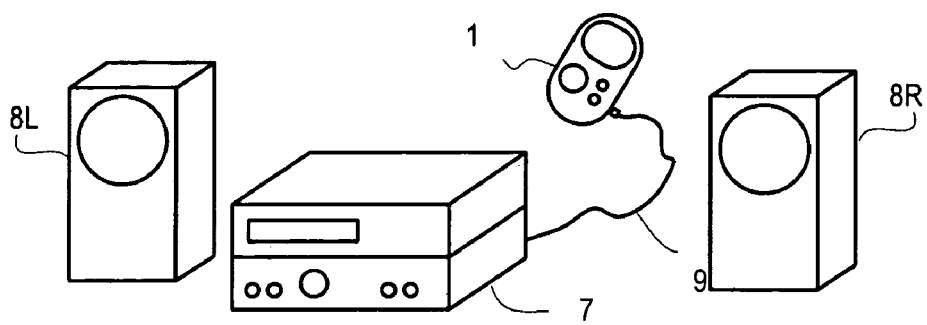

FIG. 19b shows the same apparatus 1 in a second arrangement, where no headphones are connected. Instead, the apparatus is connected via a separate connector to a docking station 5, which in turn drives larger loudspeakers 6L, 6R. Docking station 5 incorporates a higher powered amplifier than the portable device itself, and a separate power supply, usually mains-powered. FIG. 19c shows the same apparatus in a variation of the second arrangement, in which an external amplifier 7 and loudspeakers 8L, 8R are connected via a line lead 9 plugged into the headphone jack 4 in place of the headphones.

The apparatus 1 is required to drive very different loads in these arrangements. A headphone or loudspeaker will typically have an impedance of 32 ohms or less. Into this load, an output amplitude of, say 100 mV RMS will provide a moderate volume, (say −12 dB) from full scale, corresponding to a power 30 mW. When driving the line input of a larger amplifier in the second arrangement, the load impedance is typically 10 kilohms or more, and a full scale signal amplitude (0 dB) of 2V RMS is appropriate for maximum quality. If the output stage driving the socket in the first arrangement is capable of providing a 2V RMS signal, its supply voltage must be greater than 2V. When driving a headphone load in arrangement 1 from the same output stage, most of the output stage power consumption is dissipated in the form of heat, as the supply voltage is dropped to the 100 mV level in the transistors of the output stage. If, to increase battery life, the designer opts not to provide the full 2V RMS for line output situations, a poorer signal is the result.

As a result of these competing requirements, premium products in this market have conventionally adopted the practice of providing separate output stages, one used for driving headphone/speaker loads 2, and another for line out situations via the docking connector 4. Each output stage can be driven from a power supply appropriate to the voltage range, maintaining power efficiency and quality in each application. Needless to say, the requirement for separate output stages and separate power supplies for them increases the size and cost of the apparatus undesirably.

The DMCP can be incorporated in such an apparatus 1, thereby dispensing with the need for separate output stages. Instead a single output stage may be provided, with the DMCP used as its power supply. In this embodiment, the DMCP can be arranged to operate in mode 1, when the apparatus is driving a headphone load and in mode 2 when driving a further amplifier through line out.

Ideally the DMCP can be made to operate in the appropriate mode automatically, depending on the apparatus arrangement. In the case where a docking connector, separate from headphone jack 4, is used the second arrangement (FIG. 19b), the DMCP's control circuit can decide directly which mode should apply, from a general signal indicating docked status. Where the same jack 4 is used in the second arrangement as in the first arrangement, mode selection may be determined in several ways. As a first option, a switch or menu option may be available to the user to select explicitly between sound and line output modes. The user setting may alternatively be implicit in the act of turning the volume control to full scale, on the assumption that headphones will not be used at the maximum level in practice. Alternatively it may be possible to sense the by automatically sensing the output impedance or output current supply or even jack socket versus docking station operation in the case of a portable audio device.

Other possible application areas where the ability to generate a split rail supply include: (1) voltage supplies for circuits handling analog composite video signals, where a ground-referenced DC-coupled output signal can avoid black-level droop; and (2) line drivers for data links or modems such as ADSL where a ground-referenced DC-coupled output signal can reduce baseline wander effects.

For cost and size reasons, it is important to be able to integrate the functions of an MP3 player, mobile phone or any other application into a small number of integrated circuits. Therefore it is advantageous to integrate the circuitry for supply voltage generation, in this case the charge pump 400, 900, together with the functional circuitry 20, 30, 40 etc. Generally speaking, the charge pump 400, 900, includes a capacitor which cannot realistically be integrated and has to be located off-chip, with consequences for chip-pin-count and overall circuit size. Since many circuits require supplies of dual polarity (split rail supplies), this has prompted the development of voltage generation circuits that are capable of generating two (or more) output voltage supplies using a single capacitor, rather than a capacitor per required output voltage.

Many other modifications in the control scheme, the form of the controller and even specifics of the switch network may be varied. The skilled reader will appreciate that the above and other modifications and additions are possible to these circuits, without departing from the spirit and scope of the invention as defined in the appended claims. Accordingly, the above described embodiments are presented to illustrate rather than limit the scope of the invention. For interpreting this specification and claims, the reader should note that the word "comprising" does not exclude the presence of elements or steps other than those listed in a claim, the singular article "a" or "an" does not exclude a plurality (unless the context requires otherwise), and a single element may fulfil the functions of several elements recited in the claims. Any reference signs in the claims shall not be construed so as to limit their scope.

Where a claim recites that elements are "connected" or are "for connecting", this is not to be interpreted as requiring direct connection to the exclusion of any other element, but rather connection sufficient to enable those elements to function as described. The skilled reader will appreciate that a good, practical design might include many auxiliary components not mentioned here, performing, for example, start-up and shutdown functions, sensing functions, fault protection or the like, some of which have been mentioned already, and none of which detract from the basic functions characteristic of the invention in its various embodiments described above in the claims.

Labels Vout+, Vout− and VDD etc. are to be interpreted in throughout the above description to refer to either the respective terminals or the voltage at that terminal, according to context.

In addition to variations and modifications within the charge pump circuit itself, the invention encompasses all manner of apparatuses and systems incorporating the charge pump, besides the headphone amplifier application illustrated in FIG. 15. The circuit may be used to power output stages of all manner of apparatus, including communications apparatus, where the output stage may drive an antenna or transmission line, an electro-optical transducer (light emitting device) or an electromechanical transducer.

What is claimed is:

1. A charge pump circuit comprising:
an input terminal for receiving an input voltage;
first and second output terminals;
at most first and second flying capacitor terminals; and
a switch network for interconnecting said input terminal, said first and second flying capacitor terminals and said first and second output terminals to generate either a first positive output voltage and a first negative output voltage that are each substantially equal in magnitude to the magnitude of said input voltage or a second positive output voltage and a second negative output voltage that are each substantially equal in magnitude to half the magnitude of said input voltage.

2. The circuit of claim 1, further comprising a common terminal, wherein said switch network interconnects one of said first and second flying capacitor terminals to said common terminal.

3. The circuit of claim 2, wherein said switch network is operable in a plurality of states for interconnecting said input terminal, said first and second flying capacitor terminals, said common terminal and said first and second output terminals.

4. The circuit of claim 3, further comprising a controller for operating said switch network in a sequence comprising one or more of said plurality of states.

5. The circuit of claim 4, wherein said sequence comprises one or more of said plurality of states occurring at different intervals.

6. The circuit of claim 4, further comprising a control signal terminal for receiving a control signal.

7. The circuit of claim 6, wherein the circuit generates either said first positive and negative output voltages or said second positive and negative output voltages in response to said control signal.

8. The circuit of claim 6, wherein said controller varies said sequence in response to said control signal.

9. The circuit of claim 4, wherein said controller is adapted to vary said sequence of said states according to a load condition.

10. The circuit of claim 1, further comprising a comparator for comparing at least one of said positive output or negative output voltages with a reference voltage.

11. An apparatus comprising:
a flying capacitor;
first and second reservoir capacitors; and
a charge pump circuit as recited in claim 2 for providing said first positive and negative output voltages or said second positive and negative output voltages for said audio apparatus, wherein said flying capacitor is coupled to said first and second flying capacitor terminals, said first reservoir capacitor is coupled to said first output terminal and said common terminal and said second reservoir capacitor is coupled to said second output terminal and said common terminal.

12. The apparatus of claim 11, wherein the apparatus is an audio apparatus.

13. The apparatus of claim 12, wherein the audio apparatus is a MP3 player.

14. The apparatus of claim 11, wherein the apparatus is a mobile phone.

15. A charge pump circuit comprising:
an input terminal;
first and second output terminals;
a common terminal;
at most first and second flying capacitor terminals; and
a switch network, said switch network comprising;
a first switch for coupling the input terminal to the first flying capacitor terminal,
a second switch for coupling the first flying capacitor terminal to the first output terminal,
a third switch for coupling the first flying capacitor terminal to said common terminal,
a fourth switch for coupling the second flying capacitor terminal to said first output terminal,
a fifth switch for coupling the second flying capacitor terminal to said common terminal, and
a sixth switch for coupling the second flying capacitor terminal to the second output terminal.

16. The circuit of claim 15, wherein said switch network further comprises a seventh switch for coupling the input terminal to the first output terminal.

17. The circuit of claim 16, further comprising a controller for operating said switch network in a sequence of states.

18. The circuit of claim 17, further comprising a control signal input for receiving a control signal.

19. The circuit of claim 18, wherein said controller operates said switch network in said sequence according to said control signal to generate either a first positive output voltage and a first negative output voltage that are each substantially equal in magnitude to the magnitude of an input voltage on said input terminal or a second positive output voltage and a second negative output voltage that are each substantially equal in magnitude to half the magnitude of said input voltage.

20. A method of generating a plurality of split-rail voltages comprising:
interconnecting first and second output voltage terminals with an input voltage terminal and at most first and second flying capacitor terminals to generate either a first positive output voltage and a first negative output voltage that are each substantially equal in magnitude to the magnitude of said input voltage or a second positive output voltage and a second negative output voltage that are each substantially equal in magnitude to half the magnitude of said input voltage.

21. The method of claim 20, furthering comprising interconnecting at least one of said first or second flying capacitor terminals to a common terminal.

22. The method of claim 21, wherein said first and second output terminals, said input terminal, said first and second flying capacitor terminals, and said common terminal are interconnected in a plurality of states.

23. The method of claim 22, wherein one of the plurality of states is obtained by connecting said input terminal to said first flying capacitor terminal and connecting said first output terminal to said second flying capacitor terminal.

24. The method of claim 22, wherein one of the plurality of states is obtained by connecting said common terminal to said first flying capacitor terminal and connecting said second output terminal to said second flying capacitor terminal.

25. The method of claim 22, wherein one of the plurality of states is obtained by connecting said first output terminal to said first flying capacitor terminal and connecting said common terminal to said second flying capacitor terminal.

26. The method of claim 22, wherein one of the plurality of states is obtained by connecting said input terminal to said first flying capacitor terminal and connecting said common terminal to said second flying capacitor terminal.

27. The method of claim 22, wherein one of the plurality of states is obtained by connecting said first output terminal to said first flying capacitor terminal and connecting said second output terminal to said second flying capacitor terminal.

28. The method of claim 22, wherein one of the plurality of states is obtained by connecting said first output terminal to said first flying capacitor terminal and said input terminal and connecting said common terminal to said second flying capacitor terminal.

29. The method of claim 22, wherein one or more of said plurality of states are sequenced to generate either said first positive and negative output voltages or said second positive and negative output voltages.

30. The method of claim 29, wherein said sequence comprises at least two of said plurality of states.

31. The method of claim 29, wherein said sequence comprises one or more of said plurality of states occurring at different intervals.

32. The method of claim 29, wherein a control signal determines said sequence.

33. The method of claim 29, wherein a load condition determines said sequence.

34. The method of claim 22, wherein one of the plurality of states is obtained by connecting said input terminal to said first flying capacitor terminal and connecting said common terminal to said second flying capacitor terminal.

* * * * *